(12) United States Patent
Motamed et al.

(10) Patent No.: US 6,519,053 B1
(45) Date of Patent: Feb. 11, 2003

(54) METHOD AND APPARATUS FOR SMART JOB TICKET PROCESSING FOR PRINT STREAMS

(75) Inventors: Margaret Motamed, Foster City; Ravi Someshwar, Redwood City; Ravindranath Gunturu, Newark, all of CA (US)

(73) Assignee: Electronics for Imaging, Inc., Foster City, CA (US)

( * ) Notice: Subject to any disclaimer, the term of this patent is extended or adjusted under 35 U.S.C. 154(b) by 0 days.

(21) Appl. No.: 09/693,695

(22) Filed: Oct. 19, 2000

Related U.S. Application Data

(60) Provisional application No. 60/160,414, filed on Oct. 19, 1999.

(51) Int. Cl.[7] .......................... G06F 15/00; G06K 1/00; H04N 1/21; H04N 1/40
(52) U.S. Cl. .................... 358/1.16; 358/1.12; 358/1.13; 358/1.15; 358/296; 358/404; 358/444
(58) Field of Search .............................. 358/1.12, 1.13, 358/1.15, 1.16, 296, 404, 444, 504

(56) References Cited

U.S. PATENT DOCUMENTS

| | | | |
|---|---|---|---|
| 5,226,112 A | 7/1993 | Mensing et al. | 395/114 |
| 5,402,527 A | 3/1995 | Bigby et al. | 395/101 |
| 5,450,571 A * | 9/1995 | Rosekrans et al. | 358/1.13 |
| 5,454,067 A | 9/1995 | Tsai | 395/106 |
| 5,469,534 A | 11/1995 | Brindle et al. | 395/114 |
| 5,475,801 A | 12/1995 | Brindle et al. | 395/114 |
| 5,483,653 A | 1/1996 | Furman | 395/650 |
| 5,490,237 A * | 2/1996 | Zimmerman et al. | 358/1.16 |
| 5,493,635 A | 2/1996 | Brindle et al. | 395/114 |
| 5,644,683 A | 7/1997 | Ross et al. | 395/108 |
| 5,715,379 A | 2/1998 | Pavlovic et al. | 395/112 |
| 5,825,991 A | 10/1998 | Plakosk et al. | 395/115 |

FOREIGN PATENT DOCUMENTS

| | | | |
|---|---|---|---|
| EP | 574 222 A2 | 12/1993 | G06F/3/12 |
| EP | 618 529 A1 | 10/1994 | G06F/3/12 |
| EP | 621 530 A2 | 10/1994 | G06F/3/12 |
| EP | 653 700 A1 | 5/1995 | G06F/3/12 |
| EP | 574 222 B1 | 4/1998 | G06F/3/12 |
| EP | 864965 | 9/1998 | 3/12 |

* cited by examiner

*Primary Examiner*—Edward Coles
*Assistant Examiner*—Twyler Lamb

(57) ABSTRACT

A method and system of print job processing initiated by a client communicating-computer communicating with a printer server system comprising operations performed by the client communicating-computer including a rip pre-processing operation.

71 Claims, 18 Drawing Sheets

METHOD AND APPARATUS FOR SMART JOB TICKET PROCESSING FOR PRINT STREAMS

This application claims priority from Provisional Patent Application No. 60/160,414 filed Oct. 9, 1999.

TECHNICAL FIELD

This invention relates to print job streams and the optimization of print job tickets in print job streams.

BACKGROUND ART

FIG. 1A depicts the typical operational flow of a print job originating on a client operated computer and sent through a network supporting a printer server system of printer servers in the prior art.

Operation 100 starts the operations of this flowchart. Arrow 102 directs the flow of execution from operation 100 to operation 104. Operation 104 performs initiating a print job request by operating a client application on the client communicating-computer. Arrow 106 directs execution from operation 104 to operation 108. Operation 108 performs using a resident PDL driver on the client communicating-computer to create a PDL file of print job and optionally to create a job ticket. Arrow 110 directs execution from operation 108 to operation 112. Operation 112 performs sending the PDL file and the optional job ticket over the network to the printer server system. Arrow 114 directs execution from operation 112 to operation 116. Operation 116 performs spooling the print job based upon the received PDL file and the optional job ticket by the printer server system. Arrow 118 directs execution from operation 116 to operation 120. Operation 120 performs ripping the PDL file after using network to receive PDL file to create a ripped print job by printer server system. Arrow 122 directs execution from operation 120 to operation 124. Operation 124 performs compressing the ripped print job based upon the ripped print job to create a compressed print job by the printer server system. Arrow 126 directs execution from operation 124 to operation 128. Operation 128 performs sending the compressed (or uncompressed) print job to a printer by the printer server system. Arrow 130 directs execution from operation 128 to operation 132. Operation 132 terminates the operations of this flowchart.

Ripping as used herein includes operations creating a ripped PDL file. A ripped PDL file includes a raster ordered bit or byte image of each page of the document to be printed.

Consider the activities regarding the client communicating-computer. Operation 100 and arrow 102 can be seen as the client interaction operating the client communicating-computer. These can include starting and using a client application, often through stimulating the computer by tactile interaction including touching keys, in some cases, speaking to the computer, and in others, by various ways of scheduling a print job request to be initiated at a predetermined time.

Operation 104 performs initiating a print job request by operating a client application on the client communicating-computer. Examples of the variety of applications running on client communicating-computers which initiate print job requests include presentation development software such as Microsoft™ Powerpoint™, word processors, spreadsheets and graphics development software such as Adobe™ Photoshop™. Arrow 106 directs execution from operation 104 to operation 108 by sending a message to a resident thread implementing at least part of operation 108 in the real-time operating system of the client communicating-computer. The message transfer often involves either passing a pointer to a buffer or block transfer of data from one buffer to another.

Operation 108 performs using a resident PDL driver on the client communicating-computer to create a PDL file of print job and optionally to create a job ticket. Today, print job tickets typically include information such as the priority of the print job, who initiated it, and perhaps routing instructions as to where the print-out is to be sent. In certain instances, specific kinds of printers are specified, such as high-resolution color printers. Sometimes specific printers are designated. Arrow 110 directs execution from operation 108 to operation 112 by sending a message to a resident thread implementing at least part of operation 112 in the real-time operating system of the client communicating-computer. The message transfer often involves either passing a pointer to a buffer or block transfer of data from one buffer to another. Operation 112 performs sending the PDL file and the optional job ticket over the network to the printer server system.

Note that a PDL file is a term defined herein as a collection of data in a specific print definition language. The data collection is typically treated as a sequential stream of data which may be stored in computer memory, including as a file in a file management system using one or more disk drives, or transmitted sequentially to another system component. Standard PDL formats comply with print definition languages. These include the various versions of postscript (including encapsulated PostScript® .eps and regular PostScript® .ps), TIFF and PCL.

Arrow 114 directs execution from operation 112 to operation 116 by communicating the PDL file and optional job ticket across the network to operation 116 in the real-time operating system of a print server computer in the printer server system.

Consider the activities regarding the printer server computers of the printer server system. Operation 116 performs spooling the print job based upon the received PDL file and the optional job ticket by the printer server system. Arrow 118 directs execution from operation 116 to operation 120, which performs ripping the PDL file after using the network to receive PDL file to create a ripped print job by printer server system. Arrow 122 directs execution from operation 120 to operation 124, which performs compressing the ripped print job based upon the ripped print job to create a compressed print job by the printer server system. Arrow 126 directs execution from operation 124 to operation 128, which performs sending the compressed print job to a printer by the printer server system. Arrow 130 directs execution from operation 128 to operation 132, which terminates the operations of this flowchart, removing the print job from the ongoing activities monitored, controlled or performed by the printer server system.

The ripping 120 entails achieving several results. The first is determining how many pages are to be printed. This is required because at least postscript does not include this information anywhere in the contents of a PostScript® file. This is one of the most important pieces of information required to optimally direct 128 a print job to a printer.

It is important to note that this flowchart is highly concurrent in practice. Each of the operations described above operates concurrently with the other operations in certain circumstances. The same operation may be actively and independently proceeding on more than one computer simultaneously. In particular, it is frequently the case that multiple clients initiate print job requests operating distinct client communicating-computers.

It is also important to note that there is a degree of concurrency represented by the arrows of the flowchart. Arrows 106 and 110 act as data flows between the operations 104 and 108, all within the same client communicating-computer. The effect of this is near instantaneous communication, pointers to the data need only be set to achieve the communication of the print job from operation 104 to operation 108 in certain cases. More generally, block transfers are used with bus activities often running 100 million data transfers a second. Often, 32 and 128 bits are transferred in each data transfer. The resulting performance within a typical client communicating-computer of the late 1990's is between 3 and 10 gigabits per second in block transfer mode. Recall that this is happening on many client communicating-computers network-connected to a printer server system. The typical network bandwidth is currently between 10 megabits to 1 gigabits per second. Assume 10 to 200 client communicating-computers connected by a gigabit per second network, and it becomes apparent that the network communications resource is easily over loaded if the print jobs being sent across the network are large.

The size of print jobs varies greatly, from a text mode e-mail which may amount to a few thousand bytes per print job page to graphical presentations, brochures or advertising copy, which often runs several megabytes per page. These graphical documents are often large, since they include books, newspapers, newsletters, promotional literature, which is being created at an ever-increasing rate. Such print jobs can often reach 500 megabytes in size. The tendency has been for these large print jobs to first "flood" the network and then "cripple" the printers so that nothing else can be reasonably done while these large print jobs are being processed.

The number of pages is typically not known until the rip operation has been completed. However, printer server systems such as those shown in FIGS. 1B, 1C and 1D all show improved print job latency and throughput when this information can be used as early as arrow 114. What is needed is to perform part of the rip operation far earlier than at the printer server system, preferably in the client communicating-computers to determine the number of pages to be printed and the total size of the PDL file.

Before going further into the system level impact of this flowchart, it is useful to review some system block diagrams regarding printer server systems and their communications and interaction with both client communicating-computers and printers.

FIG. 1B depicts a block diagram of the conceptual components of network 3200 supporting communications between a printer server system 3500 of at least one printer server computer 3520 and client operated computers 3000 in the prior art. Client 3100 operates 3102 client communicating-computer 3000 which is accessibly coupled 3004 to computer readable memory 3006. Client communicating-computer 3000 communicates 3002 with network 3200.

Network 3200 communicates 3528 with at least one printer server computer 3520 of printer server system 3500. Printer server computer 3520 is accessibly coupled 3524 with computer readable memory 3526. At this level of detail, printer 4020 is seen communicating 4022 with printer server system 3500 in a manner which will be clarified shortly.

Note that this is the level of system insight the standard print job flow of data and operations seen in the flowchart of FIG. 1A is built upon. The advantage of this approach is that there is some optimization of the interactions at the printer. The ripping operation, combined with compression, minimizes the task to be done at the printer.

However, there is a readily evident tendency for one printer server computer to be overwhelmed by moderately sized corporate networks engaged in a lot of graphically oriented print jobs. This tendency often is measured in terms of one or two overall printer system performance measures, total pages printed in a given period of time and mean time to complete a print job. When a printer server system becomes overwhelmed, either the total pages printed goes down, or the mean time to complete a print job goes up, or both.

What is needed in this situation is a method limiting required task overhead performed at the printer server system. As stated in the discussion of FIG. 1A, what is needed is to perform part of the rip operation far earlier than at the printer server system, preferably in the client communicating-computers to determine the number of pages to be printed and the page and attributes, such as color usage, FIG. 1C depicts a block diagram of a network supporting communications between a printer server system of printer server computers and client operated computers in the prior art.

As previously shown in FIG. 1B, client 3100 operates 3102 client communicating-computer 3000 which is accessibly coupled 3004 to computer readable memory 3006. Client communicating-computer 3000 communicates 3002 with network 3200.

Printer server system 3500 contains a printer server computer 3520 communicating 3528 with network 3200. Printer server computer 3520 is accessibly coupled 3524 to computer readable memory 3526 and further communicatively coupled 4022 to printer 4020.

Printer server system 3500 further contains a printer server computer 3540 communicating 3548 with network 3200. Printer server computer 3540 is accessibly coupled 3544 to computer readable memory 3546 and further communicatively coupled 4042 to printer 4040.

Printer server system 3500 further contains a printer server computer 3560 communicating 3568 with network 3200. Printer server computer 3560 is accessibly coupled 3564 to computer readable memory 3566 and further communicatively coupled 4062 to printer 4060.

Printer server system 3500 further contains a printer server computer 3580 communicating 3588 with network 3200. Printer server computer 3580 is accessibly coupled 3584 to computer readable memory 3586 and further communicatively coupled 4082 to printer 4080.

Consider the flowchart of FIG. 1A. Arrow 114 loads network 3200 with the data transfer of the PDL file and optional job ticket from client communicating-computer 3000 to one of the printer server computers, say 3520. If printer 4020 is busy, and has a large backup of activities on printer server computer 3520, it may be preferable for the print job to be transferred to a second capable printer server computer and coupled printer or embedded controller printer. Assume that printer server computer 3540 and printer 4040 are available for such a print job. The print job would then need to be transferred across network 3200 to be processed by printer server computer 3540 and printed by printer 4040. This transfer would again load network 3200.

What is needed in this situation is a method limiting required task overhead performed at the printer server system. As stated in the discussion of FIGS. 1A and 1B, what is needed is to perform part of the rip operation far earlier than at the printer server system, preferably in the client communicating-computers to determine the number of pages to be printed and the total size of the PDL file. What is further needed is a method for limiting unnecessary repetition transferring large print job PDL files across networks.

FIG. 1D depicts a block diagram of a network supporting communications with a printer server system of printer server computers utilizing rip engines in the prior art.

Printer server system 3500 contains a printer server computer 3520 communicating 3528 with network 3200. Printer server computer 3520 is accessibly coupled 3524 to computer readable memory 3526 and further communicatively coupled 3522 to network 3512.

Network 3510 serves as a printer network driven 3518 by printer server computer 3520. Printer 4020 is communicatively coupled 4022 to network 3510. Printer 4040 is communicatively coupled 4042 to network 3510. Printer 4060 is communicatively coupled 4062 to network 3510.

Network 3512 serves as an internal printer server system network coupled 3522 through printer server computer 3520 to the main system network 3200, which provides communication access with the client communicating-computers 3000, which are not shown in this diagram.

Printer server system 3500 further contains a printer server computer 3540 communicatively coupled 3542 to network 3512. Printer server computer 3540 is accessibly coupled 3544 to computer readable memory 3546. Printer server computer 3540 is coupled 3552 with rip engine 3550.

Printer server system 3500 further contains a printer server computer 3560 communicatively coupled 3562 to network 3512. Printer server computer 3560 is accessibly coupled 3564 to computer readable memory 3566. Printer server computer 3560 is coupled 3572 with rip engine 3570 and coupled 3576 with rip engine 3574. Note that couplings 3572 and 3576 may both use a single computer buss to communicate with printer server computer 3560.

Printer server system 3500 further contains a printer server computer 3580 communicating 3588 with network 3200. Printer server computer 3580 is accessibly coupled 3584 to computer readable memory 3586 and further communicatively coupled 4082 to printer 4080. Printer server computer 3580 is coupled 3592 with rip engine 3590, coupled 3596 with rip engine 3594, and further coupled 3600 with rip engine 3598. Note that couplings 3592, 3596 and 3600 may all use a single computer buss to communicate with printer server computer 3560.

Note that there is a new systems component displayed here, the rip engine. A rip engine is a special purpose computing circuit optimized to perform the rip operation. As such it removes a major computational task from the printer server computers, allowing them to focus more thoroughly on the more general purpose tasks such as spooling, compressing and sending the compressed print jobs to the printers.

Consider the flowchart of FIG. 1A in terms of this network 3200 and printer server system 3500. A print job PDL file and optional job ticket can be sent to either printer server computer 3520 or printer server computer 3580 from a client communicating-computer 3000 (not shown).

Assume initially that printer server computer 3580 is the destination of the print job PDL file and job ticket. Once received by printer server computer 3580, spooling and then ripping of the PDL file may be performed. It has been found that, only after ripping, reasonable performance and latency estimates can be made. In certain cases, printer 4080 may be found to be over loaded, and the print job would be processed and printed faster on printer 4020. The primary reason why this has not been previously done, is that both the size of the PDL file and the number of pages to be printed must be known. This information is only available after the ripping operation. Further, by having transferred all the information to printer server computer 3580, it must be forwarded across the network 3200 to printer server computer 3520 to be further printed by printer 4020. This adds significantly to the overhead on network 3200, which would further slow down all other activities requiring communication on network 3200, such as other client communicating-computer requested print jobs.

What is needed in this situation is a method limiting required task overhead performed at the printer server system. As stated in the discussion of FIGS. 1A, 1B and 1C what is needed is to perform part of the rip operation far earlier than at the printer server system, preferably in the client communicating-computers to determine the number of pages to be printed and the total size of the PDL file. What is further needed is a method for limiting unnecessary repetition transferring large print job PDL files across networks.

FIG. 1E depicts a prior art network 3200 further comprised of a collection of smaller networks, each shown with a gateway server communicating with a distinct collection of client computers and communicating as well with network 3200.

Networks comprised of networks are quite common today. Gateway server 3220 may support a wireless network where client computers 3000, 3020 and 3024 communicate with gateway server 3220 which communicates over a wireless physical transport. Gateway server 3240 may support a wireless network where client computers 3030, 3034 and 3038 communicate with gateway server 3240 which communicates over a wireline physical transport. Gateway server 3260 may support a wireless network where client computers 3060, 3064 and 3068 communicate with gateway server 3260 which communicates over a fiber optic wireline physical transport. Gateway server 3280 may support a wireless network where client computers 3080, 3084 and 3088 communicate with gateway server 3280 which communicates over a twisted pair wireline physical transport. Some or all of these gateway servers may possess firewalls.

The different client computers may well have decided different printing requirements as well as different performance capabilities. Certain of these computers may well make a very large demand on the printer server resources, while other machines may possess very little demand. The different component networks may have distinct bandwidth capabilities and loading.

What is needed is a manner by which at least selected client computers may be intelligently directed to send print job requests to the printer server system so as to minimize print job latency or improve overall print job throughput or to balance local network bandwidth and latency issues. Knowing the size and page count of the print job would greatly help in making this estimate.

To summarize, what is needed in this situation is a method limiting required task overhead performed at the printer server system. What is further needed is a method for limiting unnecessary repetitive transferring of large print job PDL files across networks.

DISCLOSURE OF THE INVENTION

The embodiments of this invention solve at least all of these previously discussed needs.

Certain embodiments include a method of print job processing initiated by a client communicating-computer communicating with a printer server system comprising operations performed by the client communicating-computer and operations performed by the printer server system.

The client communicating-computer performs operations including the following: Executing a client application to create a print job request. Using a PDL driver based upon the print job request to create a print job PDL file. Rip preprocessing the print job PDL file to create a smart print job ticket. Sending the smart print job ticket to the printer server system. Sending the print job PDL file to the printer server system.

The printer server system performs operations including the following: Receiving the smart print job ticket to create a received smart print job ticket. Receiving the print job PDL to create a received print job PDL file. Spooling the received print job PDL file based upon the received smart print job ticket to create a spooled PDL file. Ripping the spooled PDL file based upon the received smart job ticket to create a ripped print job. Compressing the ripped print job to create a compressed print job. Sending the compressed print job based upon the received smart job ticket to a printer.

The client communicating-computer performs the rip-preprocessing to create the smart job ticket, which is then advantageously used by the printer server system to optimize spooling, ripping and sending the compressed print job to a printer.

In certain further embodiments, the smart print job ticket includes at least one of the collection comprising a page count, a PDL file size, and an image complexity measure and a page complexity measure. The page count can be advantageously used in directing a compressed print job to a printer. A PDL file size can be advantageously used to guide spooling of a received print job PDL file. A PDL file size can be advantageously used to guide ripping of the spooled print job PDL file. An image complexity measure can be advantageously used to guide the ripping of the spooled PDL file. The page complexity measure can be advantageously used to guide the ripping of the spooled PDL file.

Various combinations of the members of this collection can be further advantageous in guiding at least the spooling, ripping and sending of the compressed print job to a printer. In certain further embodiments, the smart print job ticket comprises the page count, the PDL file size, and the image complexity measure and the page complexity measure.

In certain further embodiments, the page complexity comprises a page size histogram. The page size histogram can be advantageously used in guiding the ripping of the spooled PDL file. In certain further embodiments, the page size histogram comprises a mean page size, which can be further advantageously used to guide ripping the spooled PDL file.

In certain other further embodiments, the image call complexity comprises at least one of the collection comprising an image call count total and an image call count per page histogram. Each of these can be used advantageously to guide the ripping of the spooled PDL file. In certain further embodiments, the image call count per page histogram comprises a mean image call count per page, which can be further advantageously used to guide the ripping of the spooled PDL file.

In certain further embodiments, there is a client computer collection of at least two client communicating-computers, each client communicating-computers communicating with the printer server system. Performing print job processing initiated by each of the client communicating-computer of the client computer collection communicating with the printer server system comprises the operations mentioned above for a single client communicating-computer. These embodiments are advantageous in reducing the workload at the printer server system by performing these tasks (which would otherwise be necessarily performed by the ripping operation) before the print jobs are sent from the client communicating-computers. They are also advantageous in providing the smart job ticket for each sent print job for at least all the reasons discussed above.

In certain further embodiments, sending the print job PDL file further comprises receiving a print job directive from the printer server system and sending the print job PDL file to the printer server system based upon the received print job directive. On the printer server system side, receiving the print job ticket to create a received print job ticket further comprises processing the received print job ticket to create the print job directive; and sending the print job directive to the client communicating-computer. This advantageously supports the printer server system giving the client communicating-computer guidance in the sending of the PDL print file.

In certain further embodiments, the printer server system further comprises a printer gateway collection of at least two printer server computers, each communicating to at least one of the client communicating-computers of the client computer collection. Processing by the printer server system of the received print job ticket to create the print job directive comprises the following. Examining the received print job ticket and the spooling capacity of the print job processors of the print job processor collection to create a print job spooling directive; and inserting the print job spooling directive into the print job directive. This advantageously supports the printer server system directing the spooling activity, through insertion of the spooling directive into the print job directive.

In certain further embodiments, the print job capacity collection of each of the print job processors of the print job processor collection further comprising a printer connectivity capacity. Processing the received print job ticket to create the print job directive by the printer server system comprises the following. Examining the received print job ticket and the printer connectivity capacity of the print job processors of the print job processor collection to create a print job printer directive. Inserting the print job printer directive into the print job directive. This advantageously supports the printer server system directing the ripping activity, through insertion of the print job printer directive into the print job directive.

In certain further embodiments, creating the print job spooling directive further comprises examining the received print job ticket and the spooling capacity and the printer connectivity capacity of the print job processors to create the print job spooling directive. And creating the print job printer directive comprises examining the received print job ticket and the printer connectivity capacity of the print job processors of the print job processor collection and the print job spooling directive to create the print job printer directive. This advantageously makes use of more information than predecessor embodiments, providing greater opportunities to balance the loading of the printing jobs initiated by the client communicating-computers.

In certain further embodiments, the print job capacity collection of each of the print job processors of the print job processor collection further comprises a ripping capacity. Creating the print job directive comprises examining the received print job ticket and the ripping capacity of the print job processors of the print job processor collection to create a print job ripping directive; and inserting the print job ripping directive into the print job directive. This advantageously supports the printer server system directing the ripping activity, through insertion of the print job ripping directive into the print job directive.

In certain further embodiments, creating a print job spooling directive further comprises examining the received print job ticket and the spooling capacity and the printer connectivity capacity and the ripping capacity of the print job processors of the print job processor collection to create a print job spooling directive. Creating a print job ripping directive further comprises examining the received print job ticket and the ripping capacity of the print job processors of the print job processor collection and the spooling directive to create a print job ripping directive. And creating a print job printer directive further comprises examining the received print job ticket and the printer connectivity capacity of the print job processors of the print job processor collection and the print job spooling directive and the print job ripping directive to create a print job printer directive. This advantageously makes use of more information than predecessor embodiments, providing greater opportunities to balance the loading of the printing jobs initiated by the client communicating-computers.

In certain further embodiments, the print job capacity collection of each print job processor further comprises a print job compression capacity. Creating the print job directive further comprises the following. Examining the received print job ticket and the ripping capacity and the print job compression capacity of the print job processors of the print job processor collection to create a print job compression directive; and inserting the print job compression directive into the print job directive. This advantageously supports the printer server system directing the print job compression activity, through insertion of the print job compression directive into the print job directive.

In certain further embodiments, the following refinements are advantageous. Creating a print job spooling directive further comprises examining the received print job ticket and the spooling capacity and the printer connectivity capacity and the ripping capacity and the print job compression capacity of the print job processors of the print job processor collection to create a print job spooling directive. Creating a print job ripping directive comprises examining the received print job ticket and the ripping capacity and the print job compression capacity of the print job processors of the print job processor collection and the spooling directive to create a print job ripping directive. Creating a print job printer directive further comprises examining the received print job ticket and the printer connectivity capacity of the print job processors of the print job processor collection and the print job spooling directive and the print job ripping directive and the print job compression directive to create a print job printer directive. This advantageously makes use of more information than predecessor embodiments, providing greater opportunities to balance the loading of the printing jobs initiated by the client communicating-computers.

In certain further embodiments, the spooling capacity comprises a spooling memory capacity further comprising a maximum spooling memory capacity and an available spooling memory capacity. Such embodiments advantageously present an estimate of current spooling memory. In certain further embodiments, the spooling memory capacity further comprises a committed spooling memory capacity, advantageously presenting an estimate of the near-future spooling memory capacity.

In certain further embodiments, rip pre-processing the print job PDL file further comprises rip pre-processing the print job PDL file to create a print job display list. This advantageously supports the client communicating-computer using the print job display list before the print job has actually been sent to the printer server system, much less been ripped.

In certain embodiments, the client communicating-computer operations are supported by program code segments residing in accessibly coupled computer readable memory to the client communicating-computer. In certain further embodiments, at least one of the printer server system operations are supported by program code segments residing in accessibly coupled memory of a printer server computer contained in the printer server system. In certain further embodiments, at least one of the printer server system operations are supported by program code segments residing in accessibly coupled memory of a printer gateway contained in the printer server system. In certain further embodiments, at least one printer server system operation is supported by a program code segment residing in accessibly coupled computer readable memory of a print job processor contained in the printer server system.

These and other advantages of the present invention will become apparent upon reading the following detailed descriptions and studying the various figures of the drawings.

DETAILED DESCRIPTION OF THE INVENTION

Figure 1A:
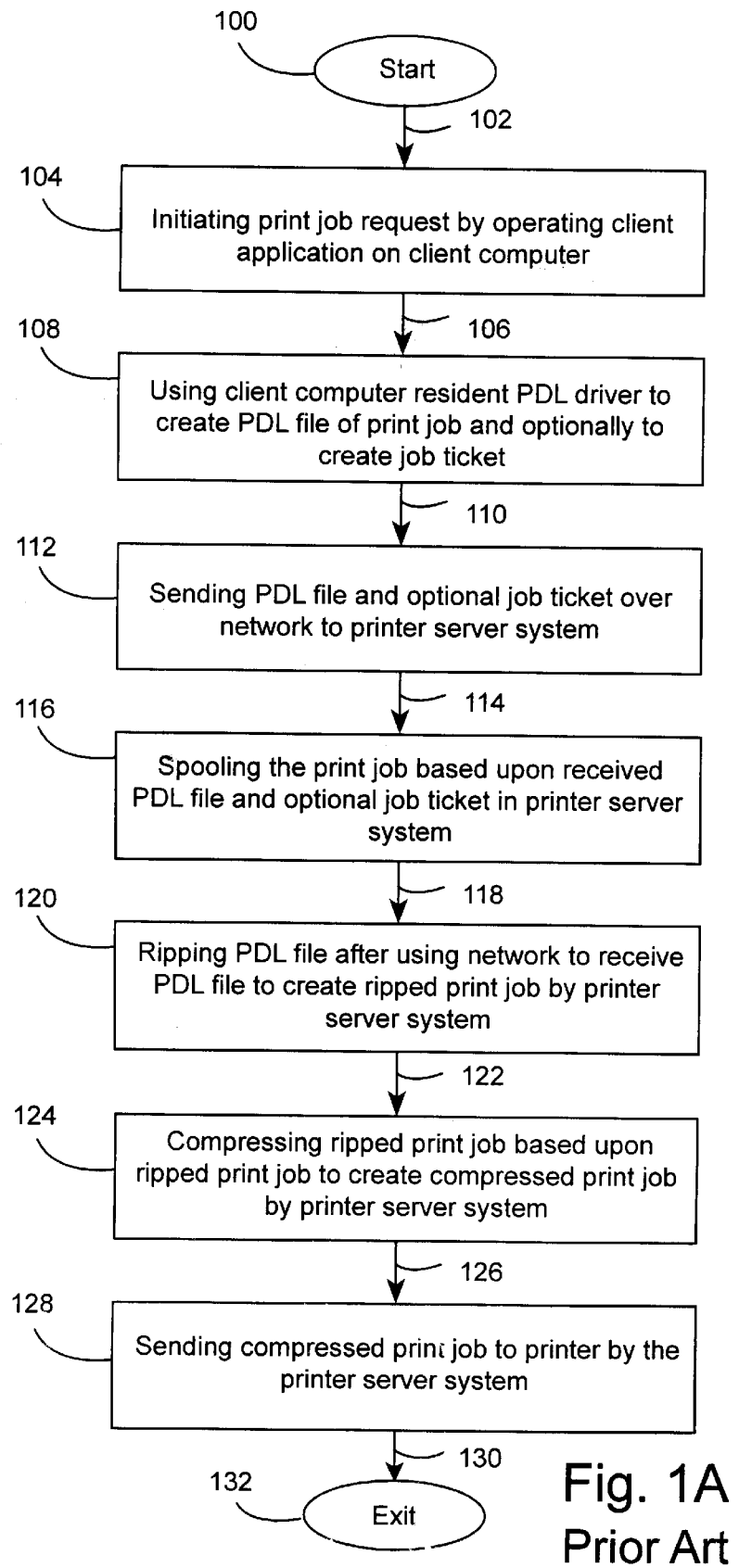
FIG. 1A depicts the typical operational flow of a print job on a network supporting a printer server system of printer servers in the prior art.
Figure 1B:
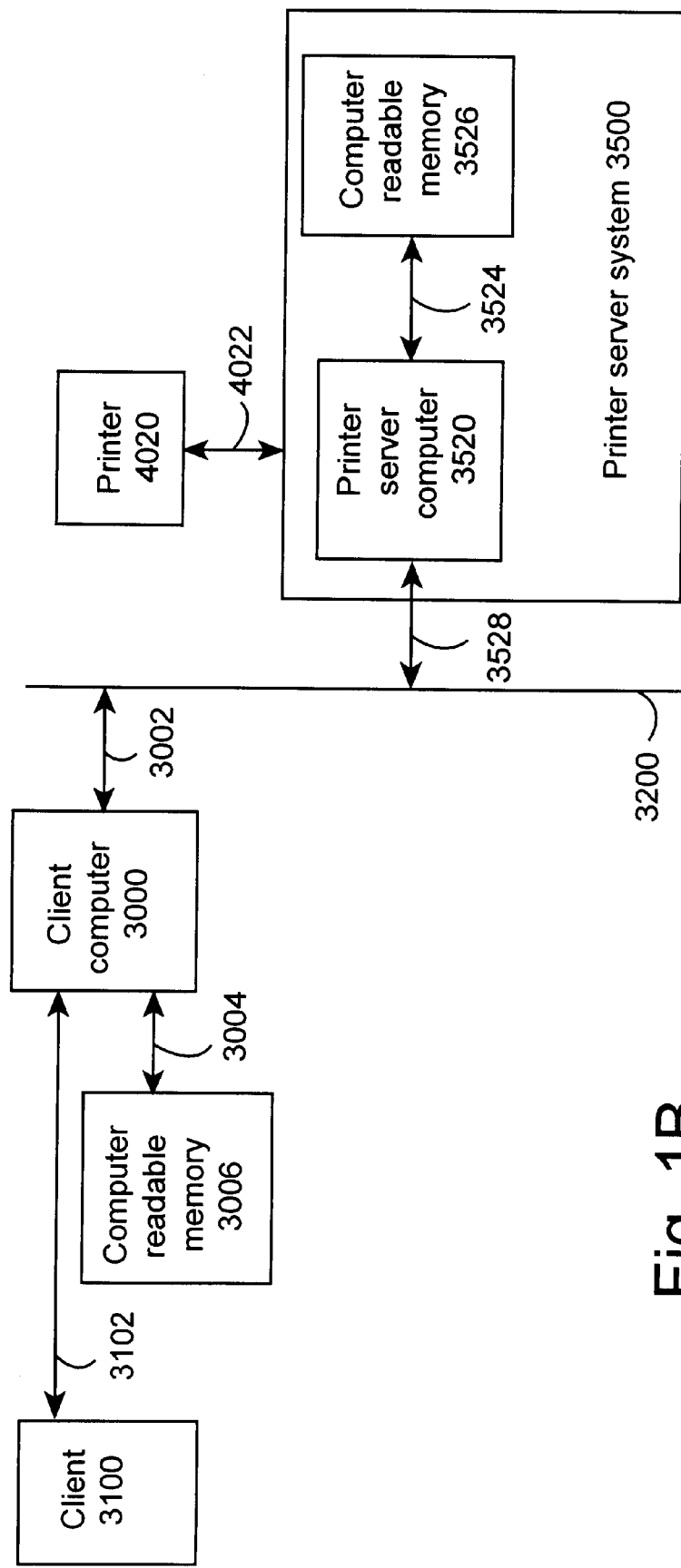
FIG. 1B depicts a block diagram of the conceptual components of a network supporting communications between a printer server system of printer servers and client operated computers in the prior art.
Figure 1C:
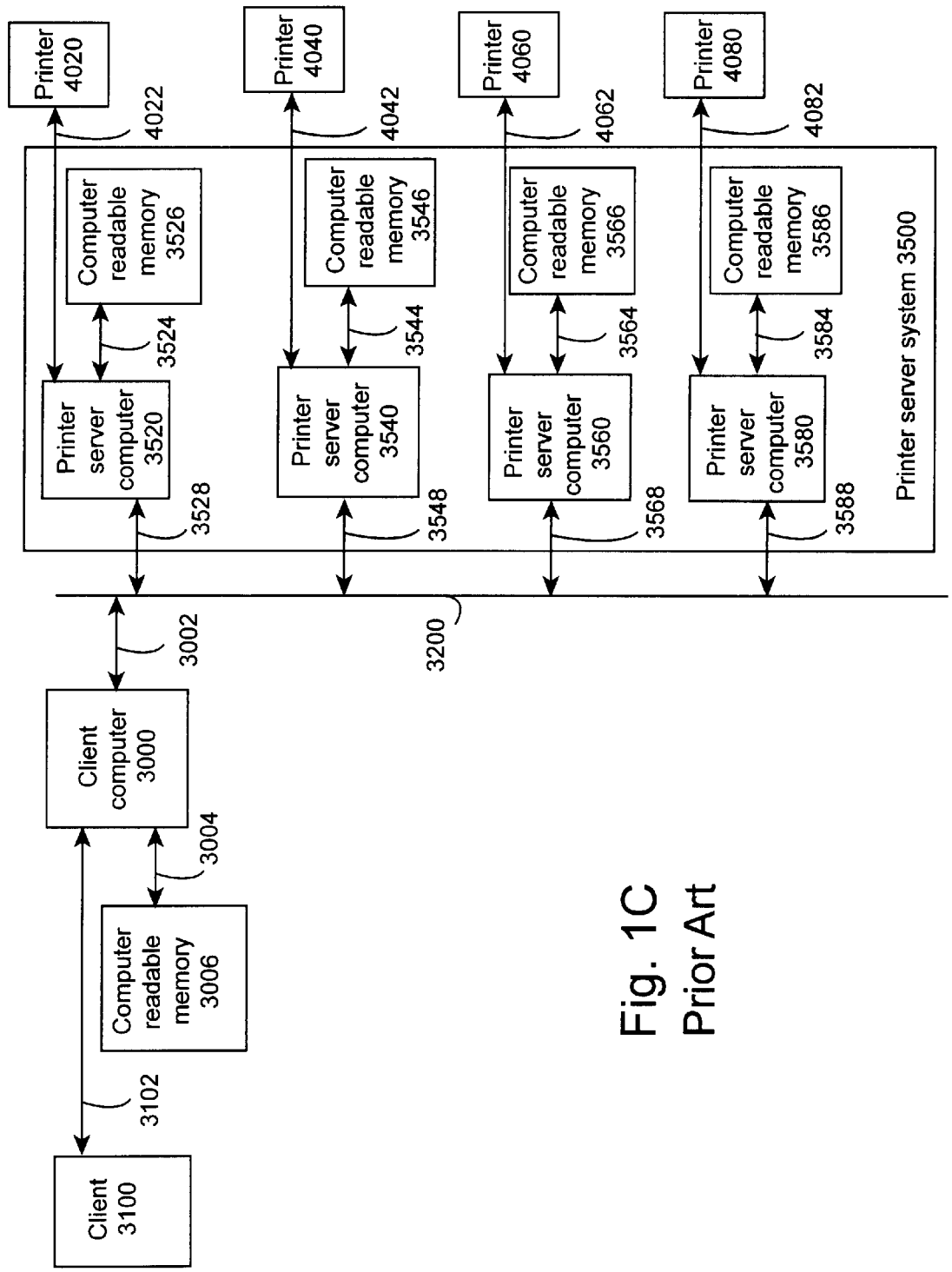
FIG. 1C depicts a block diagram of a network supporting communications between a printer server system of printer server computers and client operated computers in the prior art.
Figure 1D:
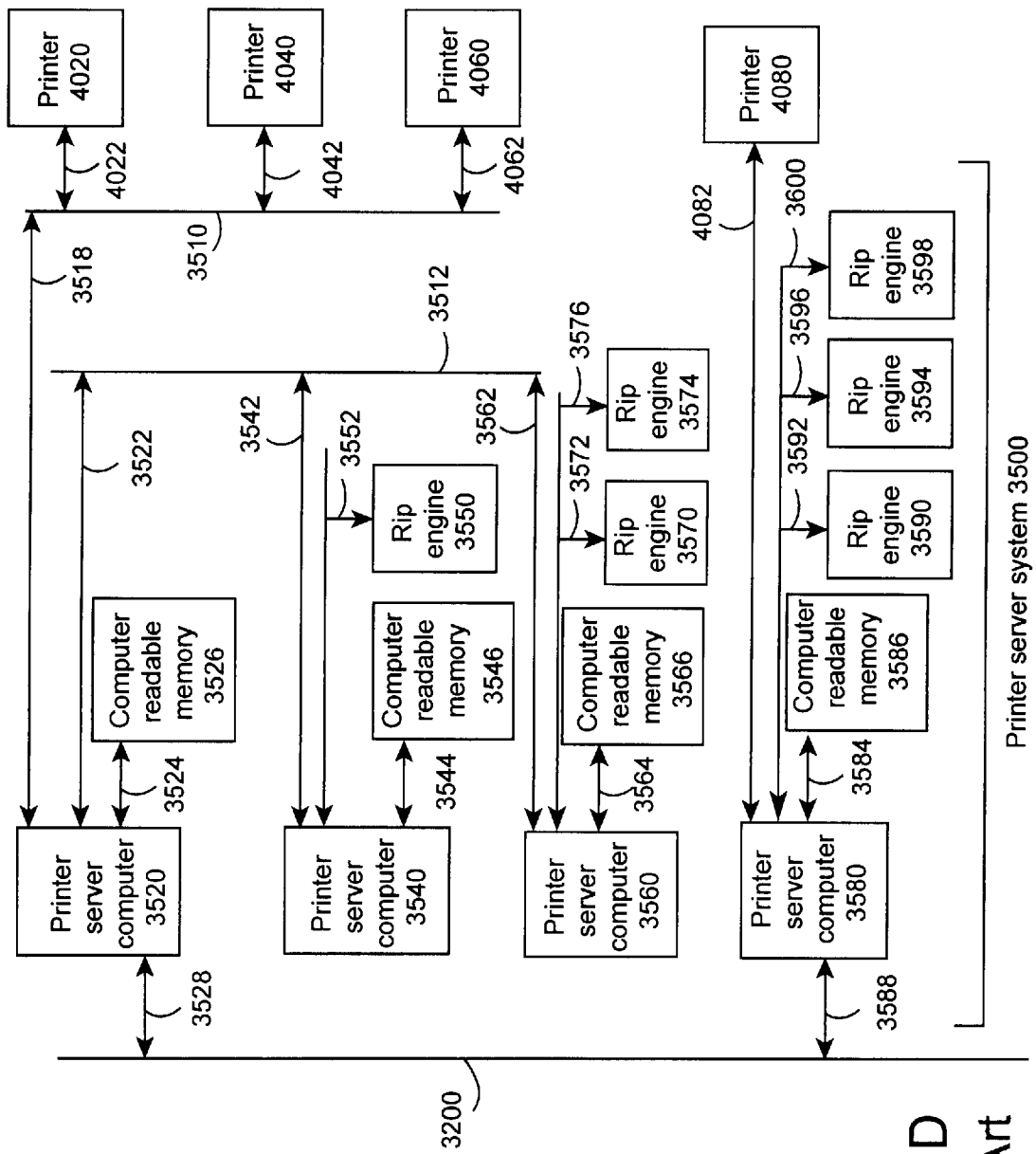
FIG. 1D depicts a block diagram of a network supporting communications with a printer server system of printer server computers utilizing rip engines in the prior art.
Figure 1E:
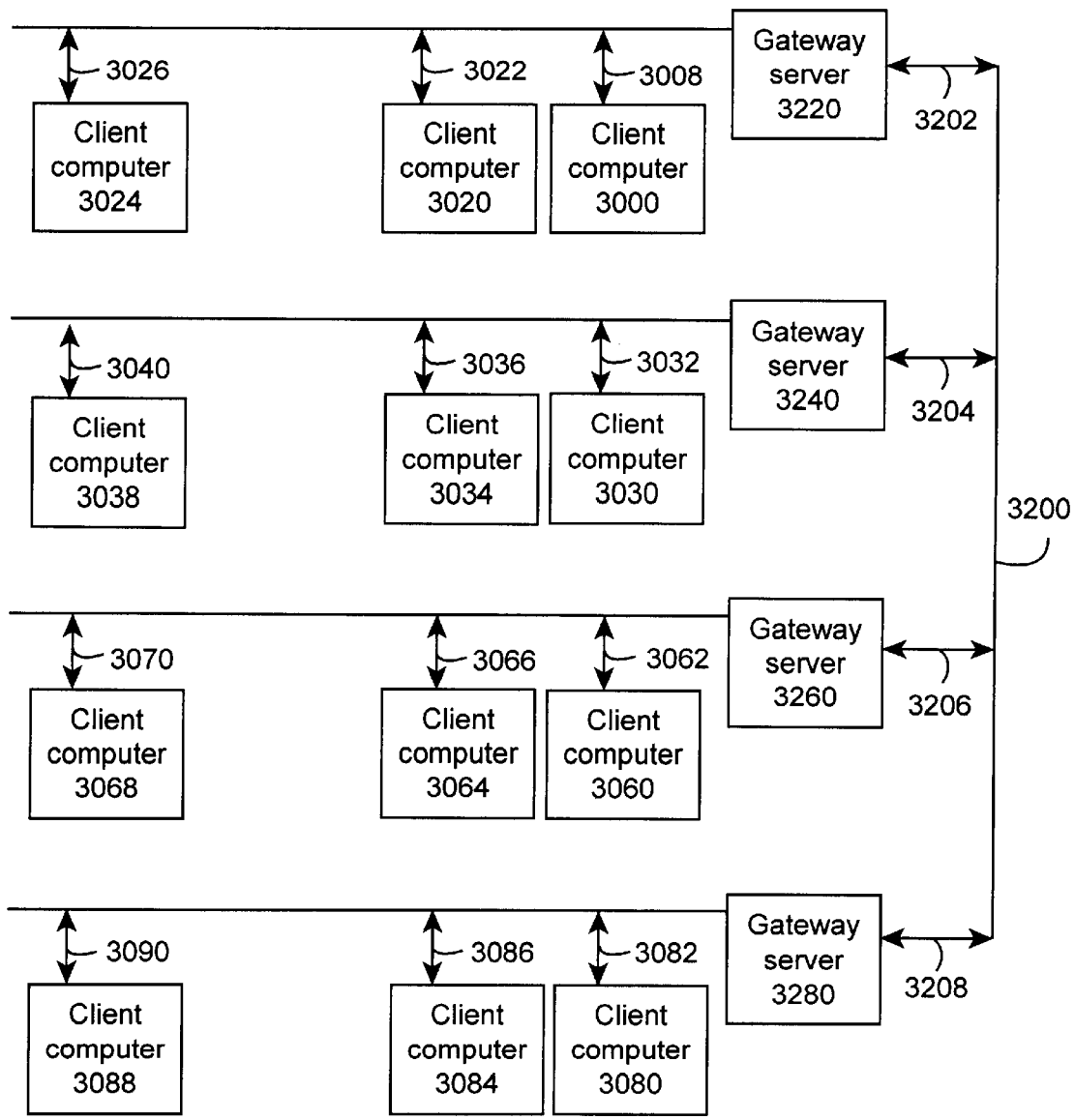
FIG. 1E depicts a prior art network 3200 further comprised of a collection of smaller networks, each shown with a gateway server communicating with a distinct collection of client computers and communicating as well with network 3200.

FIGS. 1A, 1B, 1C, 1D and 1E all relate to prior art systems and operational methods discussed in the background section previously.

As used herein, the term computer will include but not be limited to instruction processors. Instruction processors include but are not limited to both single instruction processors and multiple instruction processors. General-purpose processors include both single datapath processors and multiple datapath processors. Examples of these variations include Single Instruction-Single Datapath processors, often known by the acronym SISD. Other examples include Multiple Instruction-Multiple Datapath, often known by the acronym MIMD.

SISD processors include both scalar and super-scalar instruction processors. Scalar instruction processors are often considered to execute one instruction completely before starting to execute a subsequent instruction. Super-scalar instruction processors concurrently execute various components of several instructions. SISD processors include but are not limited to Complex Instruction Set Computers (also known as CISC) and Reduced Instruction Set Computers (also known as RISC). CISC processors include the 80×86 family architecture. RISC processors include the SPARC™ family architecture.

MIMD processors include integrated circuits employing multiple processors, often a combination of embedded processors and specialized processors. By way of example, an MIMD processor might include a general purpose embedded processor with an image processor. The general purpose processor often handles general setup and information routing of long latency information. The image processor often handles the numerically intensive image processing tasks, whether 1-D such as audio signal processing, 2-D such as still frame image processing, or multi-dimensional, such as motion video processing.

Computers also include but are not limited to inferential engines. Inferential include but are not limited to constraint propagation engines, Horn clause engines further including Prolog engines, neural network engines, fuzzy logic inferential engines and content addressable parallel processors. As used herein, instructions for inferential engines include facts and inferential rules. Inferential rules include constraint definitions, neural network node and connection definitions, predicate statements including horn clauses, fuzzy logic inference rules, as well as content and propagation rules for content addressable parallel processors.

Note that client operated computers do not have to be general purpose for the client to operate them. They could appear to be information appliances. They could be worn on the body. They could be equipped within a piece of furniture or equipment, such as a car or other transport device.

Networks, as used herein will refer to communications mechanisms including but not limited to wireline physical transport layers. Networks as used herein also refer to communications mechanisms including but not limited to wireless physical transport layers. Networks as used herein also refer to communications mechanisms including but not limited to both wireline and wireless physical transport layers. Networks as used herein also refer to communications mechanisms including but not limited to server system control of client computer communications. Networks as used herein also refer to communications mechanisms including but not limited to collections of networks which communicatively interface through gateways or bridges. Networks as used herein also refer to communications mechanisms including but not limited to those supporting TCP/IP. Networks as used herein also refer to communications mechanisms including but not limited to those further supporting the Internet. Networks as used herein also refer to communications mechanisms including but not limited to those further supporting the World Wide Web.

Figure 2:
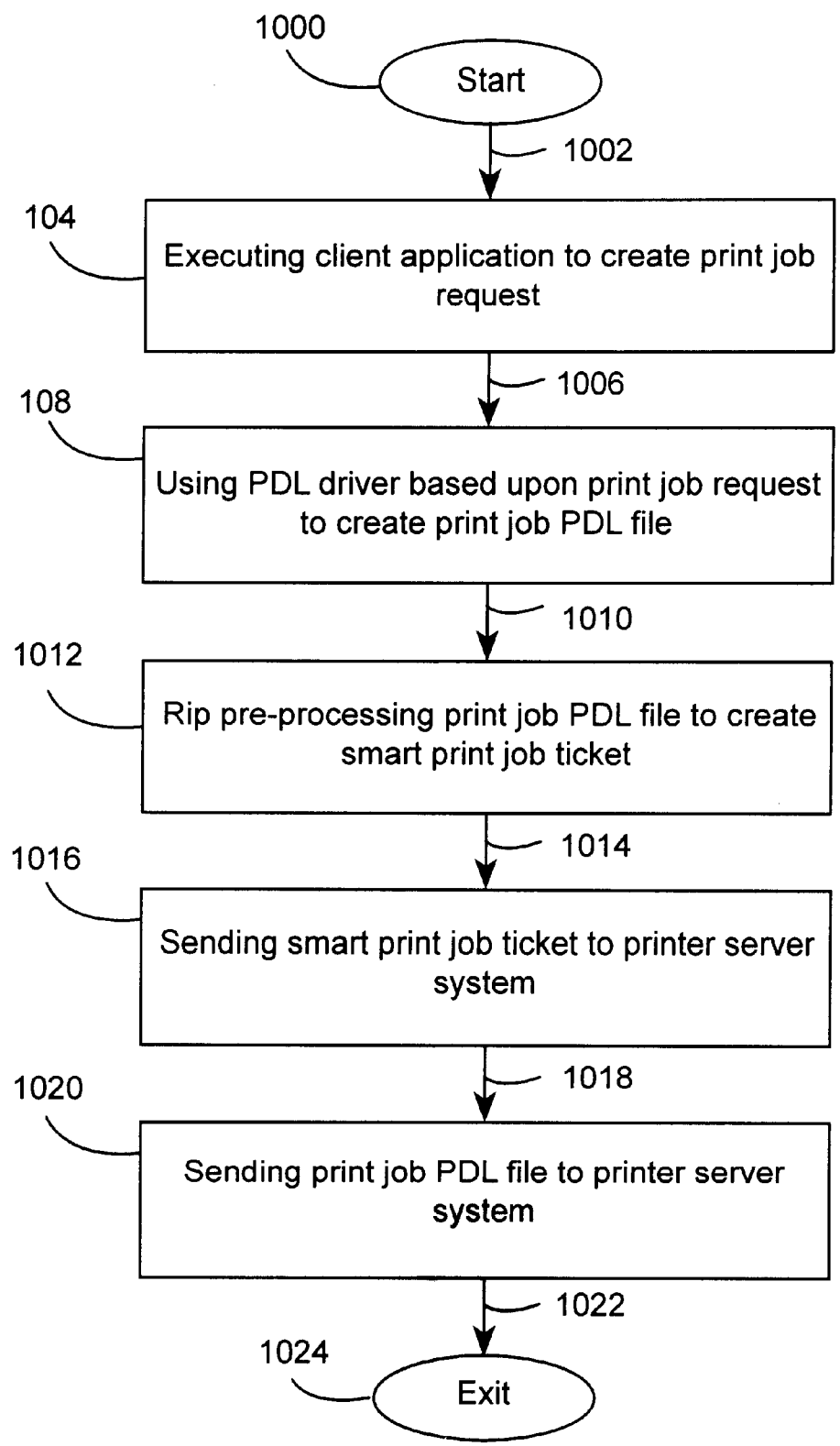
FIG. 2 depicts a flowchart of client communicating-computer operations performing print job processing initiated by the client communicating-computer in accordance with certain embodiments.

FIG. 2 depicts a flowchart of client communicating-computer operations performing print job processing initiated by the client communicating-computer in accordance with certain embodiments.

Operation 1000 starts the operations of this flowchart. Arrow 1002 directs the flow of execution from operation 1000 to operation 104. Operation 104 performs executing a client application to create a print job request. Arrow 1006 directs execution from operation 104 to operation 108. Operation 108 performs using a PDL driver based upon the print job request to create a print job PDL file. Arrow 1010 directs execution from operation 108 to operation 1012. Operation 1012 performs rip pre-processing the print job PDL file to create a smart print job ticket. Arrow 1014 directs execution from operation 1012 to operation 1016. Operation 1016 performs sending the smart print job ticket to the printer server system. Arrow 1018 directs execution from operation 1016 to operation 1020. Operation 1020 performs sending the print job PDL file to the printer server system. Arrow 1022 directs execution from operation 1020 to operation 1024. Operation 1024 terminates the operations of this flowchart.

In certain further embodiments, the client computer collection contains at least two client communicating-computers, each client communicating-computer communicating with the printer server system. In certain further embodiments, performing print job processing initiated by each of the client communicating-computer of the client computer collection with the printer server system comprises each client communicating-computer performing at least the operations depicted in this flowchart on each of the client communicating-computers. Note that in certain further embodiments, only client communicating-computers possessing above a predetermined minimum of performance and memory capacity may perform these operations.

In certain embodiments, a program operating system comprised of program code segments residing in accessibly coupled computer readable memory of the client communicating-computer supports the above described operations.

Certain embodiments include but are not limited to a system comprised of a client computer collection containing at least one client communicating-computer, each client communication-computer communicating with the printer server system and each client communicating-computer accessibly connected to computer readable memory containing program code segments as part of a program operating system supporting the above discussed operations.

Figure 3:
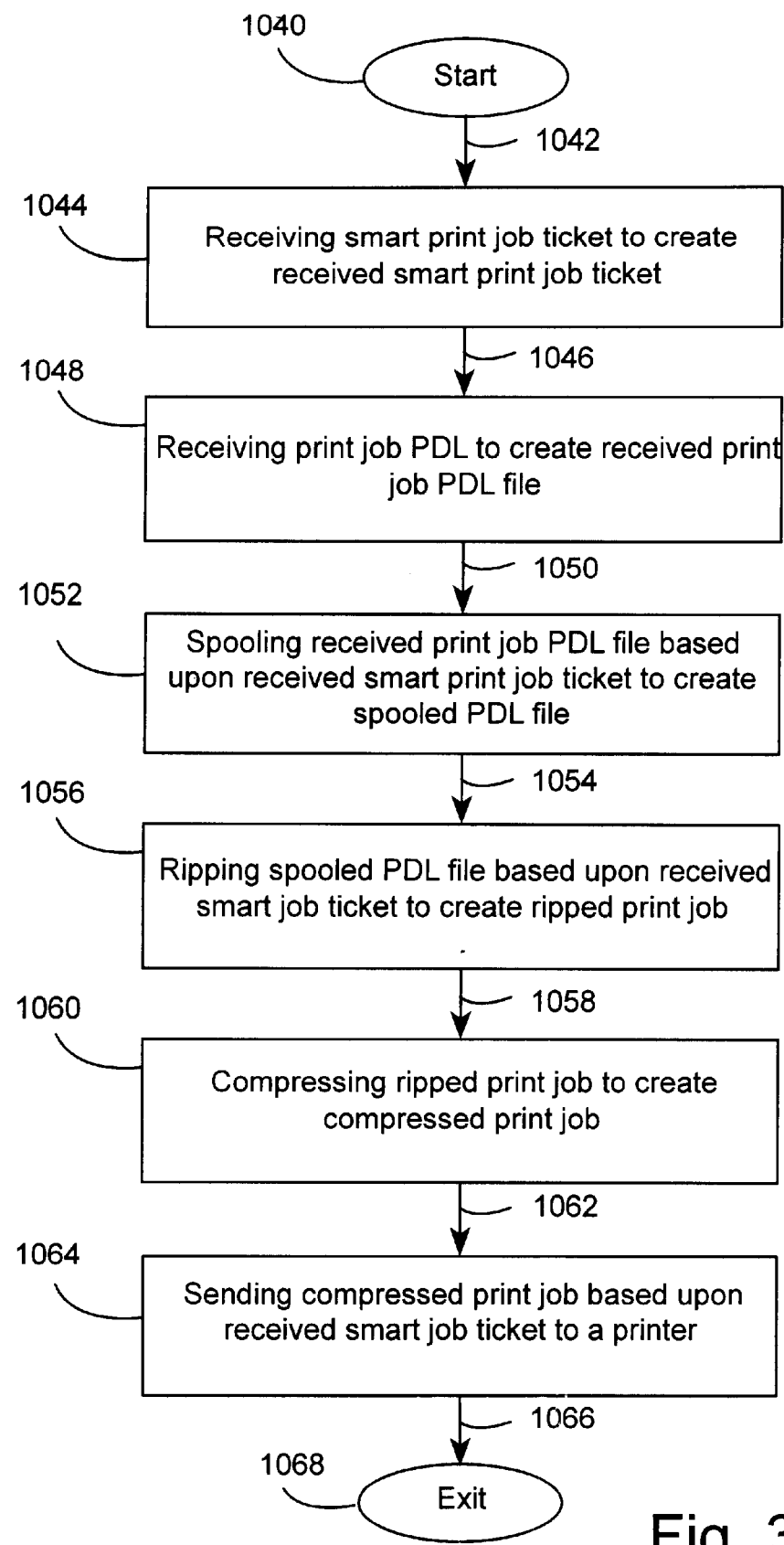
FIG. 3 depicts a flowchart of printer server system operations performing print job processing initiated by the client communicating-computer in accordance with certain embodiments.

FIG. 3 depicts a flowchart of printer server system operations performing print job processing initiated by the client communicating-computer in accordance with certain embodiments.

Operation 1040 starts the operations of this flowchart. Arrow 1042 directs the flow of execution from operation 1040 to operation 1044. Operation 1044 performs receiving the smart print job ticket to create a received smart print job ticket. Arrow 1046 directs execution from operation 1044 to operation 1048. Operation 1048 performs receiving the print job PDL to create a received print job PDL file. Arrow 1050 directs execution from operation 1048 to operation 1052. Operation 1052 performs spooling the received print job PDL file based upon the received smart print job ticket to create a spooled PDL file. Arrow 1054 directs execution from operation 1052 to operation 1056. Operation 1056 performs ripping the spooled PDL file based upon the received smart job ticket to create a ripped print job. Arrow 1058 directs execution from operation 1056 to operation 1060. Operation 1060 performs compressing the ripped print job to create a compressed print job. Arrow 1062 directs execution from operation 1060 to operation 1064. Operation 1064 performs sending the compressed print job based upon the received smart job ticket to a printer. Arrow 1066 directs execution from operation 1064 to operation 1068. Operation 1068 terminates the operations of this flowchart.

Figure 4A:
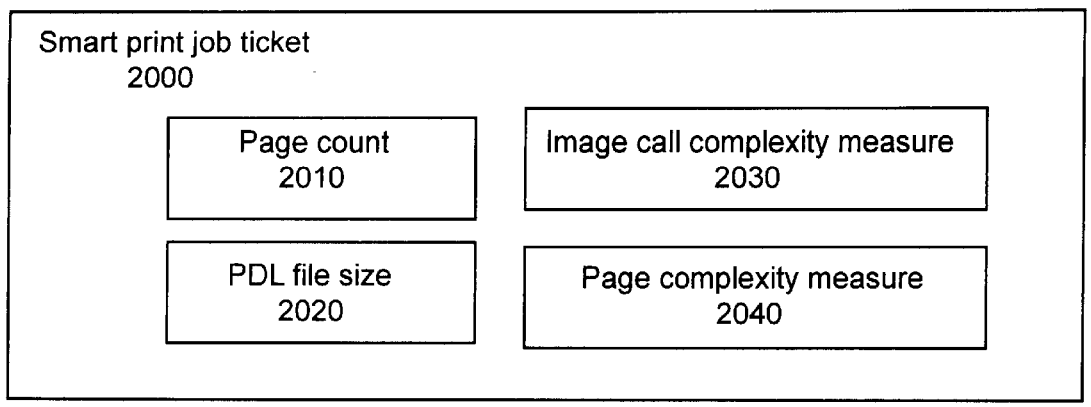
FIG. 4A depicts contents included in a smart job ticket 2000 generated by the rip pre-processing operation 1012 by the client communicating-computer 3000 in accordance with certain embodiments.

FIG. 4A depicts contents included in a smart job ticket 2000 generated by the rip pre-processing operation 1012 by the client communicating-computer 3000 in accordance with certain embodiments.

In certain further embodiments, the smart print job ticket 2000 includes at least one of the collection comprising a page count 2010; a PDL file size 2020; an image call complexity measure 2030; and a page complexity measure 2040.

In certain further embodiments, the smart print job ticket 2000 includes a page count 2010; a PDL file size 2020; an image call complexity measure 2030; and a page complexity measure 2040.

Figure 4B:
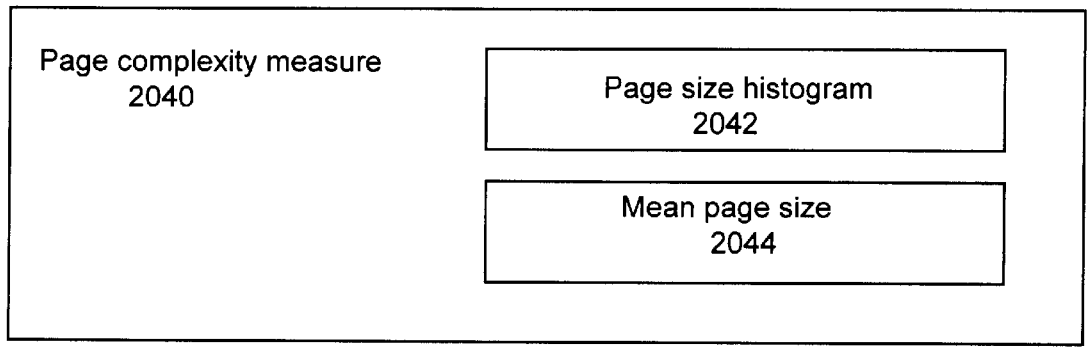
FIG. 4B depicts contents of the page complexity measure 2040 included in a smart job ticket 2000 generated by the rip pre-processing operation 1012 by the client communicating-computer 3000 in accordance with certain embodiments.

FIG. 4B depicts contents of the page complexity measure 2040 included in a smart job ticket 2000 generated by the rip pre-processing operation 1012 by the client communicating-computer 3000 in accordance with certain embodiments.

In certain further embodiments, the page complexity measure 2040 comprises a page size histogram 2042. In certain further embodiments, the page complexity measure 2040 comprises a page size histogram 2042 further comprising a mean page size 2044. An important complexity measure is knowledge of the mean complexity of the pages. This provides significant information on overall page complexity of the print job. Note that often a relatively small part, say 20–25%, of the pages require 75% or more of the complexity of the print job. Knowing which pages are most complex can be useful in scheduling ripping and printing.

Figure 4C:
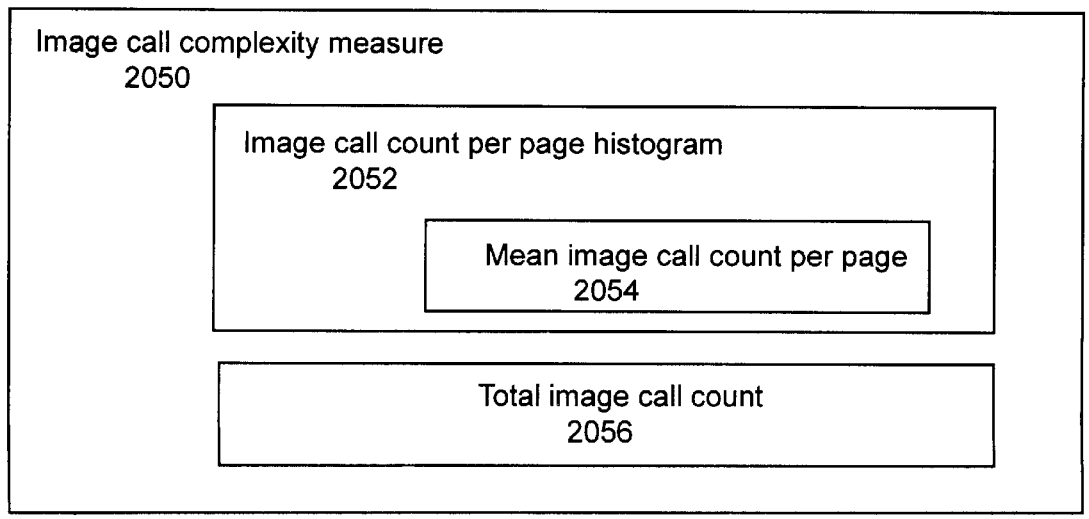
FIG. 4C depicts contents of the image call complexity measure 2050 included in a smart job ticket 2000 generated by the rip pre-processing operation 1012 by the client communicating-computer 3000 in accordance with certain embodiments.

FIG. 4C depicts contents of the image call complexity measure 2050 included in a smart job ticket 2000 generated by the rip pre-processing operation 1012 by the client communicating-computer 3000 in accordance with certain embodiments in accordance with certain embodiments.

In certain further embodiments, image call complexity measure 2050 includes at least one of the collection comprising an image call count total 2056 and an image call count per page histogram 2052. In certain further embodiments, image call complexity measure 2050 includes the image call count total 2056 and the image call count per page histogram 2052. Both the image call count total 2056 and the image call count per page histogram 2052 aid in the ripping and printer operation scheduling.

In certain further embodiments, the image call count per page histogram 2052 further comprises a mean image call count per page 2054. The mean image call count per page 2054 provides useful information regarding the scheduling of ripping and printer operations for the print job.

Figure 5A:
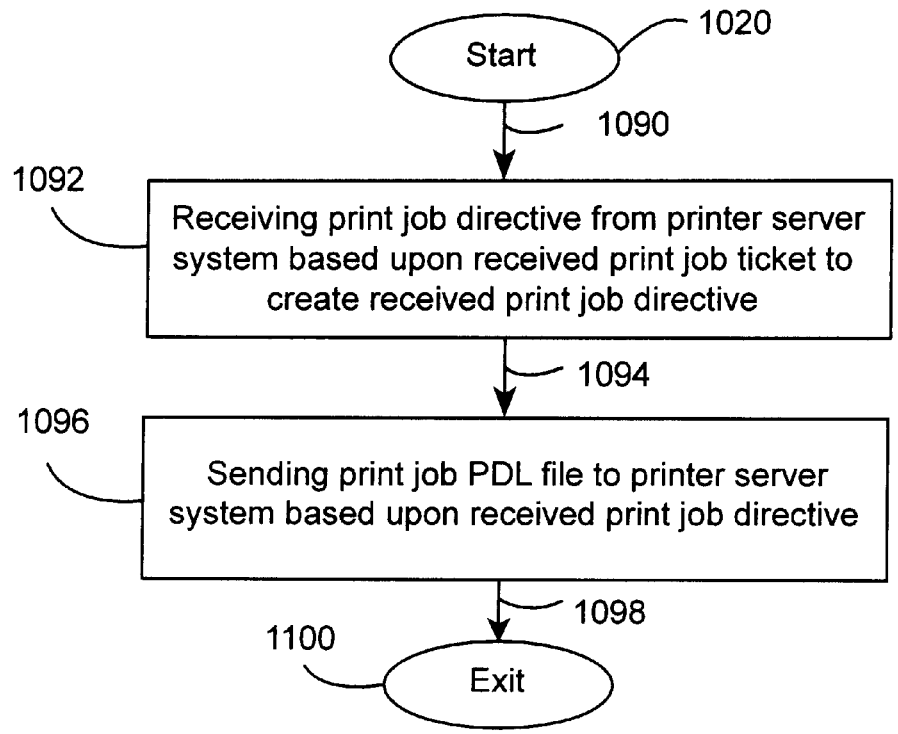
FIG. 5A depicts a detail flowchart of operation 1020 of FIG. 2 performing sending the print job PDL file to the printer server system in accordance with certain embodiments.

FIG. 5A depicts a detail flowchart of operation 1020 of FIG. 2 performing sending the print job PDL file to the printer server system in accordance with certain embodiments.

Arrow 1090 directs the flow of execution from starting operation 1020 to operation 1092. Operation 1092 performs receiving a print job directive from the printer server system based upon the received print job ticket to create a received print job directive. Arrow 1094 directs execution from operation 1092 to operation 1096. Operation 1096 performs sending the print job PDL file to the printer server system based upon the received print job directive. Arrow 1098 directs execution from operation 1096 to operation 1100. Operation 1100 terminates the operations of this flowchart.

Figure 5B:
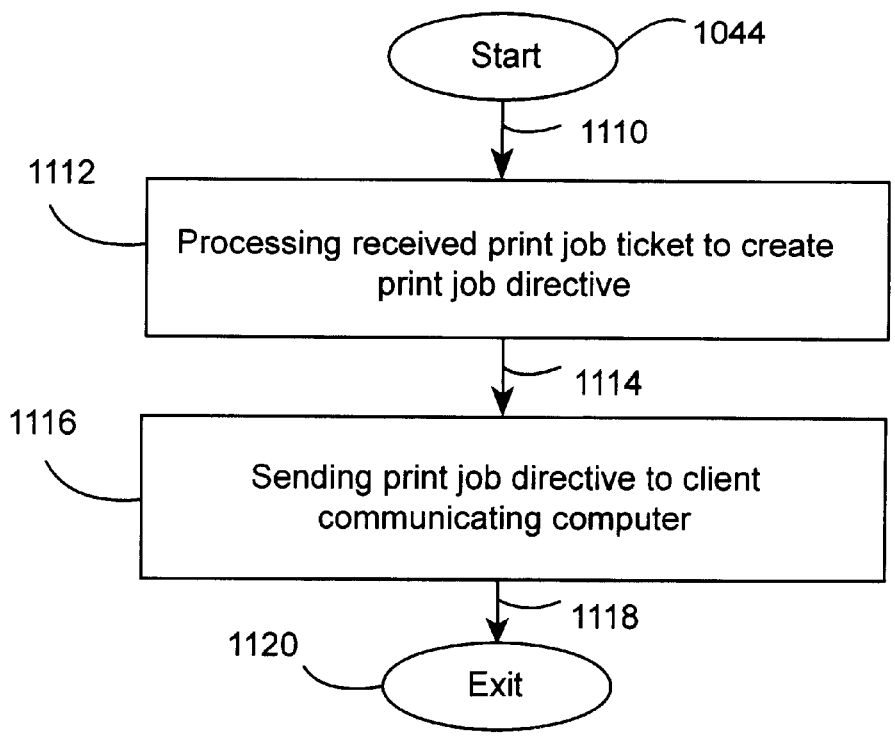
FIG. 5B depicts a detail flowchart of operation 1044 of FIG. 3 further performing receiving the print job ticket to create a received print job ticket in accordance with certain embodiments.

FIG. 5B depicts a detail flowchart of operation 1044 of FIG. 3 further performing receiving the print job ticket to create a received print job ticket in accordance with certain embodiments.

Arrow 1110 directs the flow of execution from starting operation 1044 to operation 1112. Operation 1112 performs processing the received print job ticket to create the print job directive. Arrow 1114 directs execution from operation 1112 to operation 1116. Operation 1116 performs sending the print job directive to the client communicating-computer. Arrow 1118 directs execution from operation 1116 to operation 1120. Operation 1120 terminates the operations of this flowchart.

In certain further embodiments, the printer server system further comprises a printer gateway collection of at least two printer server computers, each communicating to at least one of the client communicating-computers of the client computer collection.

Figure 6A:
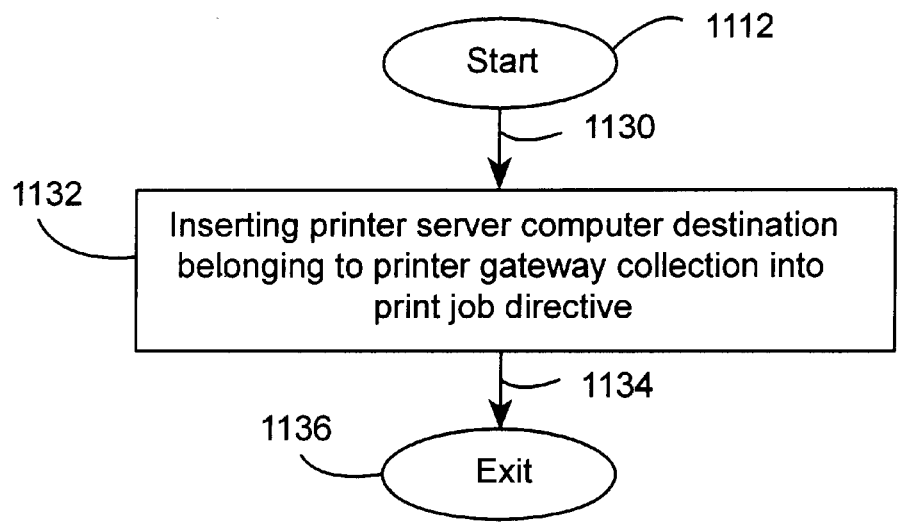
FIG. 6A depicts a detail flowchart of operation 1112 of FIG. 5B performing inserting a printer server computer destination belonging to the printer gateway collection into the print job directive in accordance with certain embodiments.

FIG. 6A depicts a detail flowchart of operation 1112 of FIG. 5B performing inserting a printer server computer destination belonging to the printer gateway collection into the print job directive in accordance with certain embodiments.

Arrow 1130 directs the flow of execution from starting operation 1112 to operation 1132. Operation 1132 performs inserting a printer server computer destination belonging to the printer gateway collection into the print job directive. Arrow 1134 directs execution from operation 1132 to operation 1136. Operation 1136 terminates the operations of this flowchart.

Figure 6B:
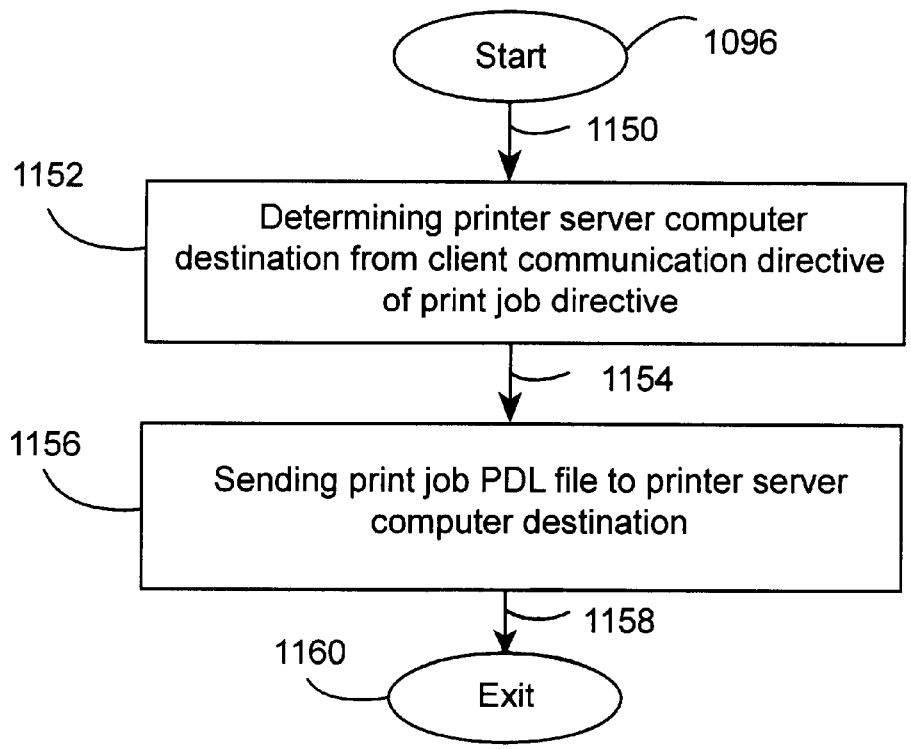
FIG. 6B depicts a detail flowchart of operation 1096 of FIG. 5A further performing sending the print job PDL file to the printer server system in accordance with certain embodiments.

FIG. 6B depicts a detail flowchart of operation 1096 of FIG. 5A further performing sending the print job PDL file to the printer server system in accordance with certain embodiments.

Arrow 1150 directs the flow of execution from starting operation 1096 to operation 1152. Operation 1152 performs determining the printer server computer destination from the client communication directive of the print job directive. Arrow 1154 directs execution from operation 1152 to operation 1156. Operation 1156 performs sending the print job PDL file to the printer server computer destination. Arrow 1158 directs execution from operation 1156 to operation 1160. Operation 1160 terminates the operations of this flowchart.

Figure 7A:
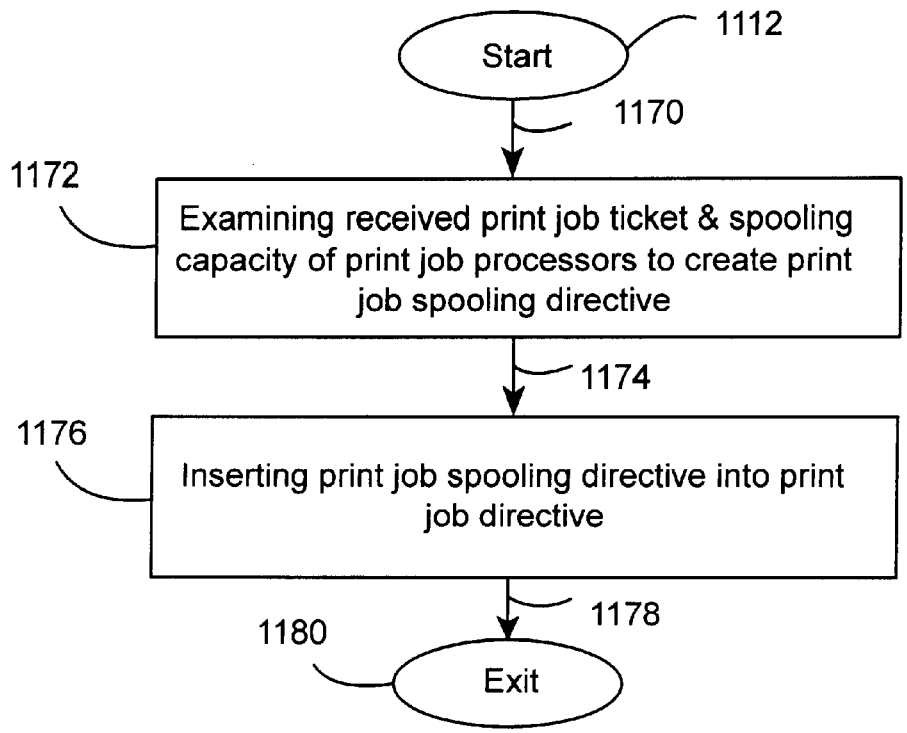
FIG. 7A depicts a detail flowchart of operation 1112 of FIG. 5B further performing processing the received print job ticket to create the print job directive in accordance with certain embodiments wherein the printer server system further comprises a print job processor collection comprising at least two print job processors each with a print job capacity collection comprising a spooling capacity.

FIG. 7A depicts a detail flowchart of operation 1112 of FIG. 5B further performing processing the received print job ticket to create the print job directive in accordance with certain embodiments wherein the printer server system further comprises a print job processor collection comprising at least two print job processors each with a print job capacity collection comprising a spooling capacity.

Arrow 1170 directs the flow of execution from starting operation 1112 to operation 1172. Operation 1172 performs examining the received print job ticket and the spooling capacity of the print job processors of the print job processor collection to create a print job spooling directive. Arrow 1174 directs execution from operation 1172 to operation 1176. Operation 1176 performs inserting the print job spooling directive into the print job directive. Arrow 1178 directs execution from operation 1176 to operation 1180. Operation 1180 terminates the operations of this flowchart.

Figure 7B:
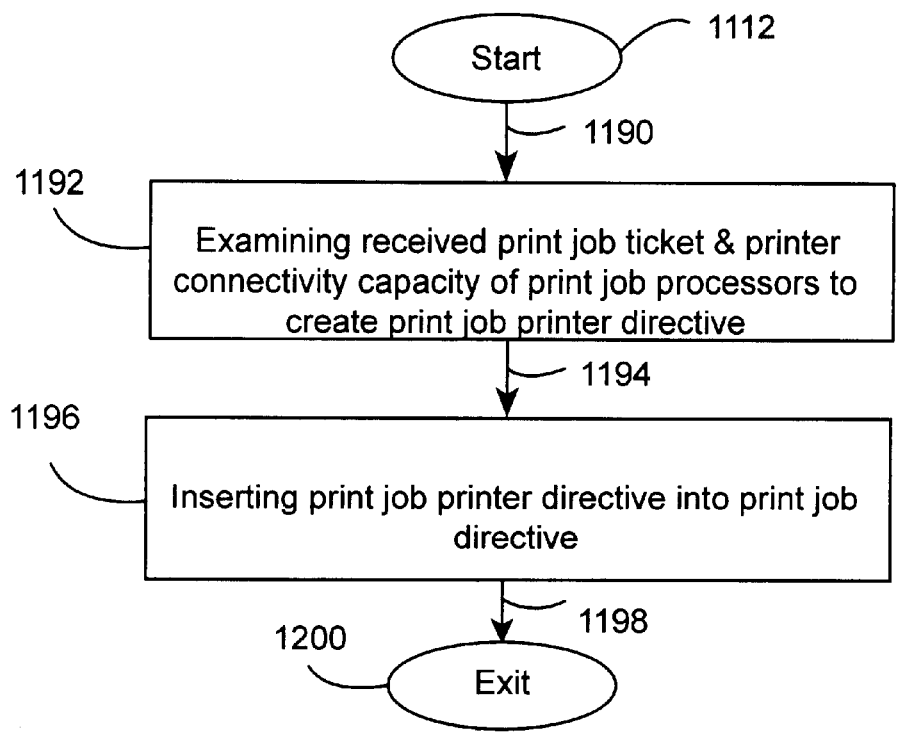
FIG. 7B depicts a detail flowchart of operation 1112 of FIG. 5B further performing processing the received print job ticket to create the print job directive in accordance with certain embodiments wherein the print job capacity collection of each of the print job processors of the print job processor collection further comprises a printer connectivity capacity.

FIG. 7B depicts a detail flowchart of operation 1112 of FIG. 5B further performing processing the received print job ticket to create the print job directive in accordance with certain embodiments wherein the print job capacity collection of each of the print job processors of the print job processor collection further comprises a printer connectivity capacity.

Arrow 1190 directs the flow of execution from starting operation 1112 to operation 1192. Operation 1192 performs examining the received print job ticket and the printer connectivity capacity of the print job processors of the print job processor collection to create a print job printer directive. Arrow 1194 directs execution from operation 1192 to operation 1196. Operation 1196 performs inserting the print job printer directive into the print job directive. Arrow 1198 directs execution from operation 1196 to operation 1200. Operation 1200 terminates the operations of this flowchart.

Figure 8A:
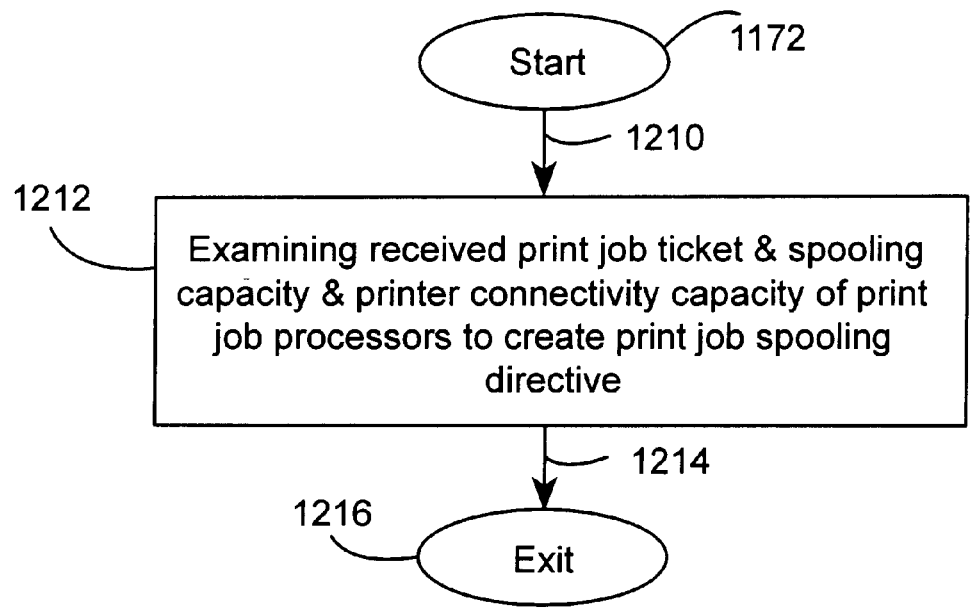
FIG. 8A depicts a detail flowchart of operation 1172 of FIG. 7A further performing the job spooling directive in accordance with certain embodiments.

FIG. 8A depicts a detail flowchart of operation 1172 of FIG. 7A further performing the job spooling directive in accordance with certain embodiments.

Arrow 1210 directs the flow of execution from starting operation 1172 to operation 1212. Operation 1212 performs examining the received print job ticket and the spooling capacity and the printer connectivity capacity of the print job processors of the print job processor collection to create the print job spooling directive. Arrow 1214 directs execution from operation 1212 to operation 1216. Operation 1216 terminates the operations of this flowchart.

Figure 8B:
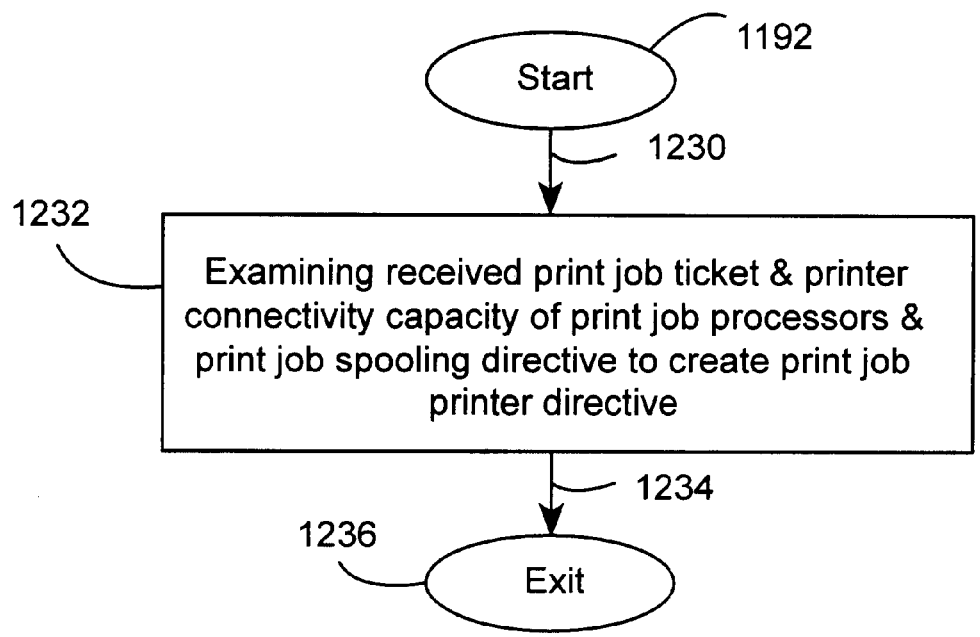
FIG. 8B depicts a detail flowchart of operation 1192 of FIG. 7B further performing creating the print job printer directive in accordance with certain embodiments.

FIG. 8B depicts a detail flowchart of operation 1192 of FIG. 7B further performing creating the print job printer directive in accordance with certain embodiments.

Arrow 1230 directs the flow of execution from starting operation 1192 to operation 1232. Operation 1232 performs examining the received print job ticket and the printer connectivity capacity of the print job processors of the print job processor collection and the print job spooling directive to create the print job printer directive. Arrow 1234 directs execution from operation 1232 to operation 1236. Operation 1236 terminates the operations of this flowchart.

Figure 9:
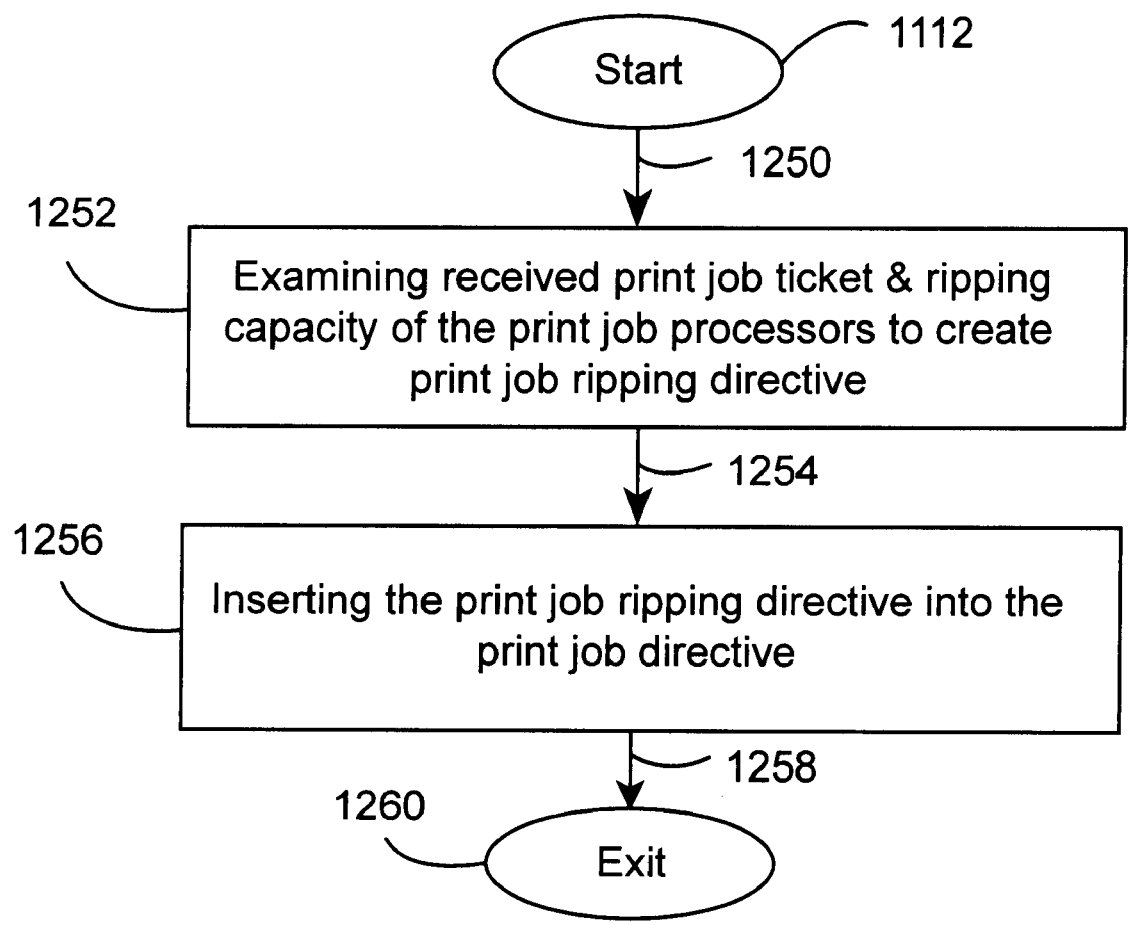
FIG. 9 depicts a detail flowchart of operation 1112 of FIG. 5B further performing creating the print job directive in accordance with certain embodiments wherein the print job capacity collection of each of the print job processors of the print job processor collection further comprises a ripping capacity.

FIG. 9 depicts a detail flowchart of operation 1112 of FIG. 5B further performing creating the print job directive in accordance with certain embodiments wherein the print job capacity collection of each of the print job processors of the print job processor collection further comprises a ripping capacity.

Arrow 1250 directs the flow of execution from starting operation 1112 to operation 1252. Operation 1252 performs examining the received print job ticket and the ripping capacity of the print job processors of the print job processor collection to create a print job ripping directive. Arrow 1254 directs execution from operation 1252 to operation 1256. Operation 1256 performs inserting the print job ripping directive into the print job directive. Arrow 1258 directs execution from operation 1256 to operation 1260. Operation 1260 terminates the operations of this flowchart.

Figure 10A:
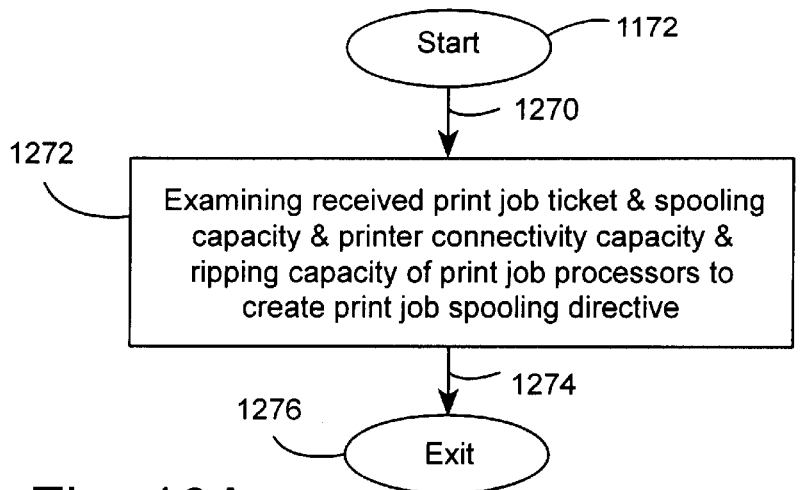
FIG. 10A depicts a detail flowchart of operation 1172 of FIG. 7A further performing creating a print job spooling directive in accordance with certain embodiments.

FIG. 10A depicts a detail flowchart of operation 1172 of FIG. 7A further performing creating a print job spooling directive in accordance with certain embodiments.

Arrow 1270 directs the flow of execution from starting operation 1172 to operation 1272. Operation 1272 performs examining the received print job ticket and the spooling capacity and the printer connectivity capacity and the ripping capacity of the print job processors of the print job processor collection to create a print job spooling directive. Arrow 1274 directs execution from operation 1272 to operation 1276. Operation 1276 terminates the operations of this flowchart.

Figure 10B:
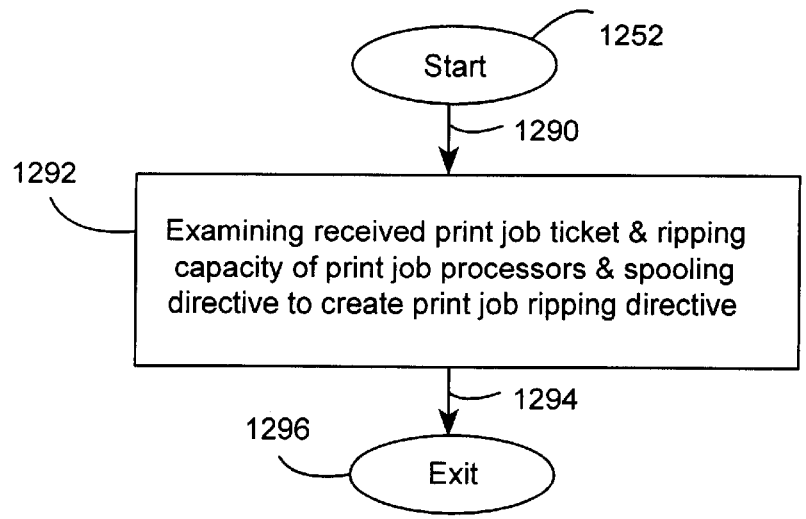
FIG. 10B depicts a detail flowchart of operation 1252 of FIG. 9 further performing creating a print job ripping directive in accordance with certain embodiments.

FIG. 10B depicts a detail flowchart of operation 1252 of FIG. 9 further performing creating a print job ripping directive in accordance with certain embodiments.

Arrow 1290 directs the flow of execution from starting operation 1252 to operation 1292. Operation 1292 performs examining the received print job ticket and the ripping capacity of the print job processors of the print job processor collection and the spooling directive to create a print job ripping directive. Arrow 1294 directs execution from operation 1292 to operation 1296. Operation 1296 terminates the operations of this flowchart.

Figure 10C:
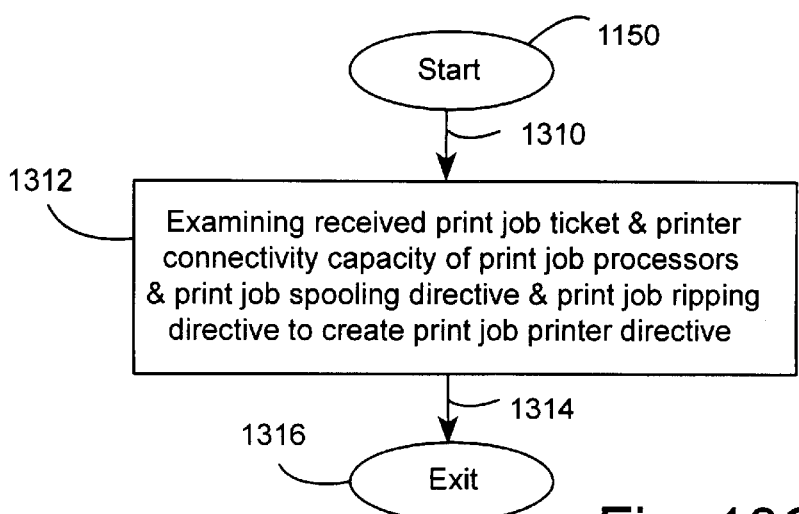
FIG. 10C depicts a detail flowchart of operation 1192 of FIG. 7B further performing creating a print job printer directive in accordance with certain embodiments.

FIG. 10C depicts a detail flowchart of operation 1192 of FIG. 7B further performing creating a print job printer directive in accordance with certain embodiments.

Arrow 1310 directs the flow of execution from starting operation 1192 to operation 1312. Operation 1312 performs examining the received print job ticket and the printer connectivity capacity of the print job processors of the print job processor collection and the print job spooling directive and the print job ripping directive to create a print job printer directive. Arrow 1314 directs execution from operation 1312 to operation 1316. Operation 1316 terminates the operations of this flowchart.

Figure 11:
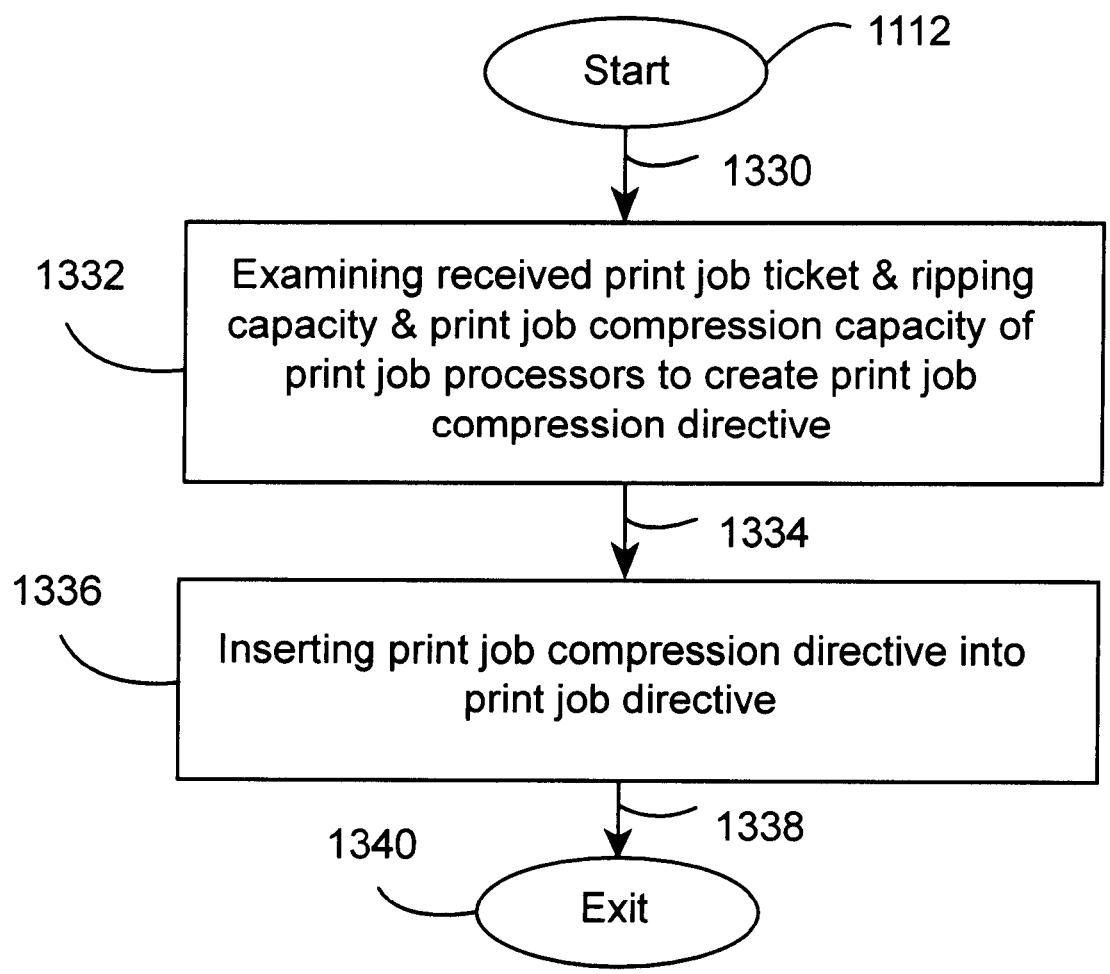
FIG. 11 depicts a detail flowchart of operation 1112 of FIG. 5B further performing creating the print job directive in accordance with certain embodiments wherein the print job capacity collection of each of the print job processors of the print job processor collection further comprises a print job compression capacity.

FIG. 11 depicts a detail flowchart of operation 1112 of FIG. 5B further performing creating the print job directive in accordance with certain embodiments wherein the print job capacity collection of each of the print job processors of the print job processor collection further comprises a print job compression capacity.

Arrow 1330 directs the flow of execution from starting operation 1112 to operation 1332. Operation 1332 performs examining the received print job ticket and the ripping capacity and the print job compression capacity of the print job processors of the print job processor collection to create a print job compression directive. Arrow 1334 directs execution from operation 1332 to operation 1336. Operation 1336 performs inserting the print job compression directive into the print job directive. Arrow 1338 directs execution from operation 1336 to operation 1340. Operation 1340 terminates the operations of this flowchart.

Figure 12A:
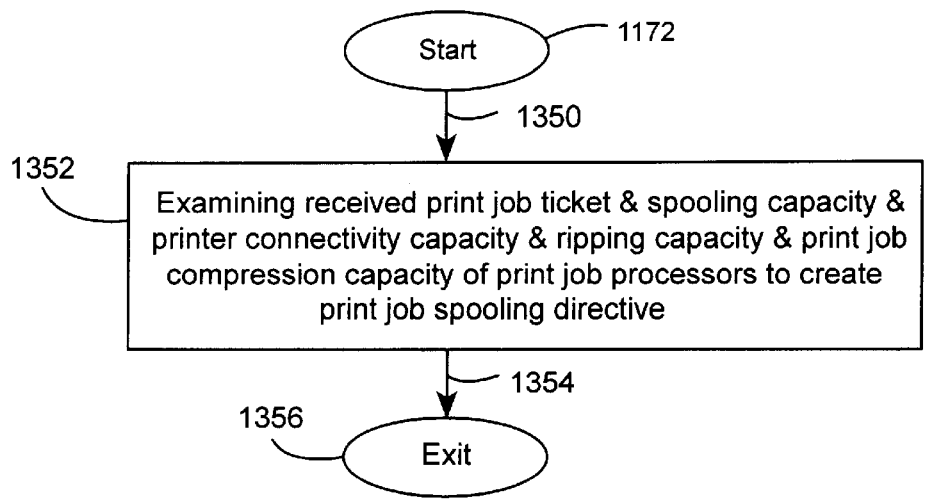
FIG. 12A depicts a detail flowchart of operation 1172 of FIG. 7A further performing creating the print job spooling directive in accordance with certain embodiments.

FIG. 12A depicts a detail flowchart of operation 1172 of FIG. 7A further performing creating the print job spooling directive in accordance with certain embodiments.

Arrow 1350 directs the flow of execution from starting operation 1172 to operation 1352. Operation 1352 performs examining the received print job ticket and the spooling capacity and the printer connectivity capacity and the ripping capacity and the print job compression capacity of the print job processors of the print job processor collection to create a print job spooling directive. Arrow 1354 directs execution from operation 1352 to operation 1356. Operation 1356 terminates the operations of this flowchart.

Figure 12B:
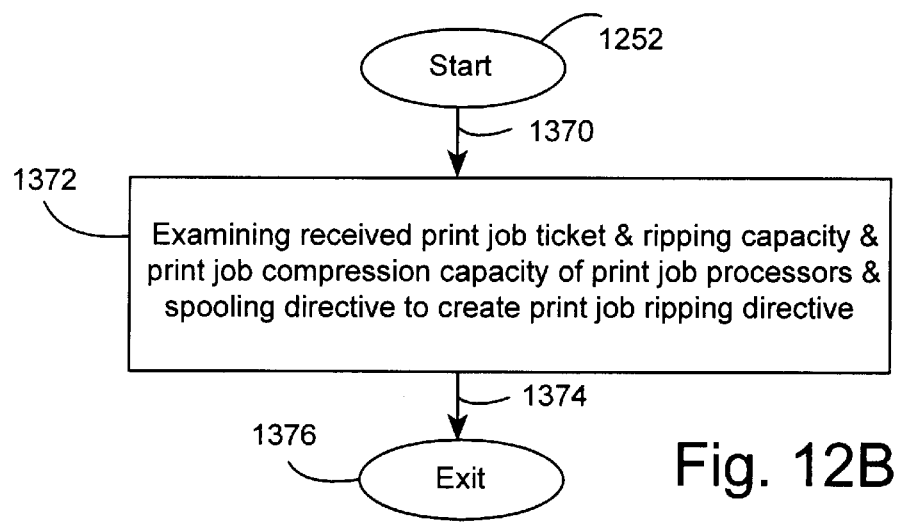
FIG. 12B depicts a detail flowchart of operation 1252 of FIG. 9 further performing creating the print job ripping directive in accordance with certain embodiments.

FIG. 12B depicts a detail flowchart of operation 1252 of FIG. 9 further performing creating the print job ripping directive in accordance with certain embodiments.

Arrow 1370 directs the flow of execution from starting operation 1252 to operation 1372. Operation 1372 performs examining the received print job ticket and the ripping capacity and the print job compression capacity of the print job processors of the print job processor collection and the spooling directive to create a print job ripping directive. Arrow 1374 directs execution from operation 1372 to operation 1376. Operation 1376 terminates the operations of this flowchart.

Figure 12C:
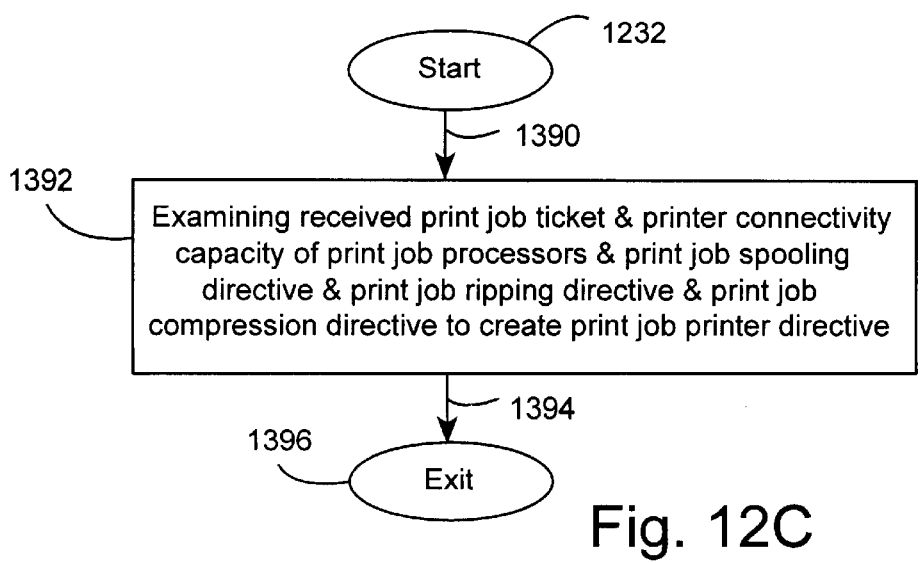
FIG. 12C depicts a detail flowchart of operation 1232 of FIG. 8B further performing creating a print job printer directive in accordance with certain embodiments.

FIG. 12C depicts a detail flowchart of operation 1232 of FIG. 8B further performing creating a print job printer directive in accordance with certain embodiments.

Arrow 1390 directs the flow of execution from starting operation 1232 to operation 1392. Operation 1392 performs examining the received print job ticket and the printer connectivity capacity of the print job processors of the print job processor collection and the print job spooling directive and the print job ripping directive and the print job compression directive to create a print job printer directive. Arrow 1394 directs execution from operation 1392 to operation 1396. Operation 1396 terminates the operations of this flowchart.

Figure 13A:
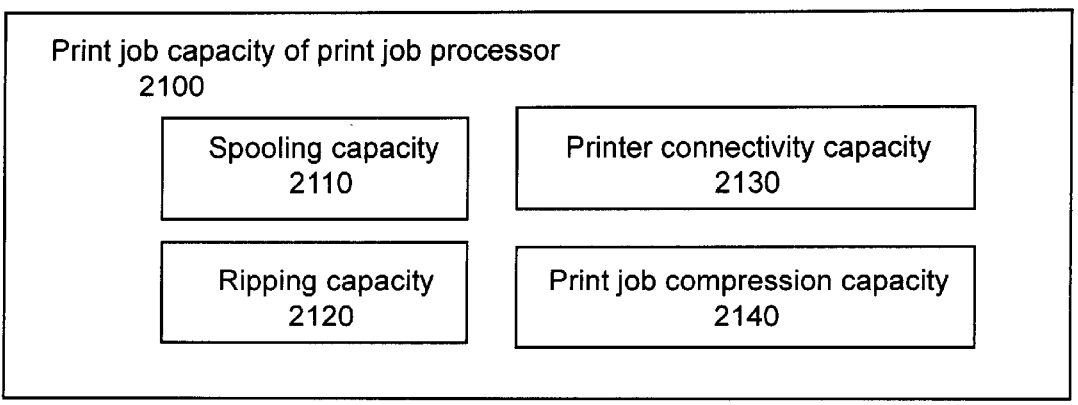
FIG. 13A depicts print job capacities 2100 which may be associated with a print job processor of the print job processor collection of the printer server system in accordance with certain embodiments.

FIG. 13A depicts print job capacities 2100 which may be associated with a print job processor of the print job processor collection of the printer server system in accordance with certain embodiments.

In certain embodiments, the print job capacity 2100 of a print job processor includes at least one of the collection comprising spooling capacity 2110; ripping capacity 2120; printer connectivity capacity 2130; and print job compression capacity 2140. In certain further embodiments, print job capacity 2100 may include any combination of the collection comprising spooling capacity 2110; ripping capacity 2120; printer connectivity capacity 2130; and print job compression capacity 2140. In certain further embodiments, print job capacity 2100 comprises spooling capacity 2110; ripping capacity 2120; printer connectivity capacity 2130; and print job compression capacity 2140.

In certain embodiments, printer connectivity capacity 2130 includes a printer identification. In certain further embodiments, the printer identification includes a network path. In certain further embodiments, the printer identification includes a printer capability list. Examples of entries in such a printer capability list include but are not limited to color printing capability, printer resolution modes, two sided printing capability, stapling capability, automatic paper feed capabilities, and specialized collating capabilities.

Figure 13B:
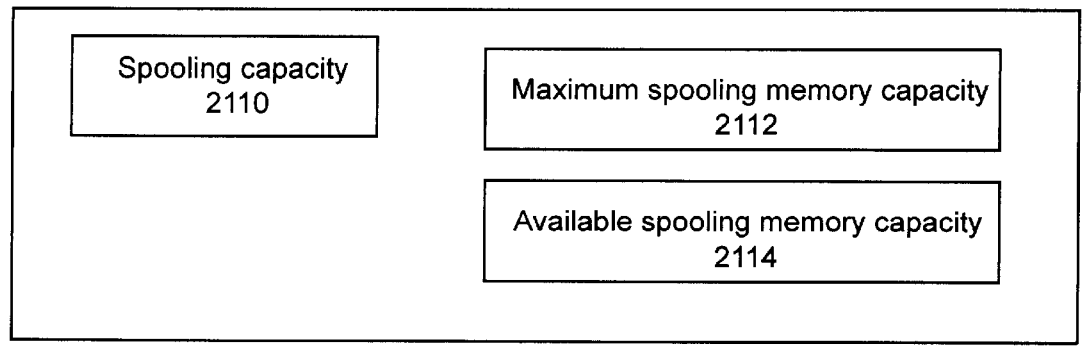
FIG. 13B depicts spooling capacity 2110 components in accordance with certain embodiments.

FIG. 13B depicts spooling capacity 2110 components in accordance with certain embodiments.

In certain embodiments, spooling capacity 2110 has components maximum spooling memory capacity 2112 and available spooling memory capacity 2114. These components are advantageous in providing a current time spooling estimate, which aids in directing the spooling operation.

Figure 13C:
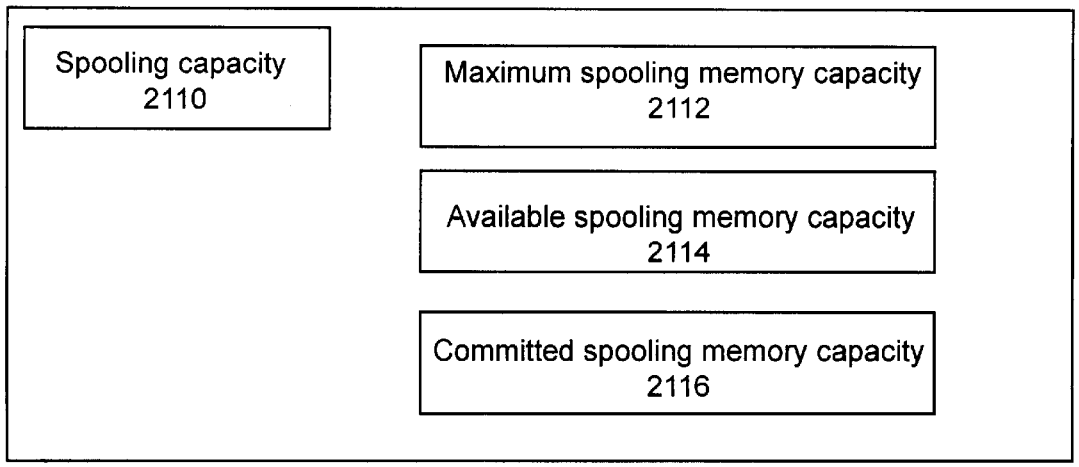
FIG. 13C depicts spooling capacity 2110 components in accordance with certain further embodiments.

FIG. 13C depicts spooling capacity 2110 components in accordance with certain further embodiments.

In certain further embodiments, spooling capacity 2110 has components maximum spooling memory capacity 2112 and available spooling memory capacity 2114, as well as committed spooling memory capacity 2116. These components are advantageous in providing not only a current time spooling estimate, but also a near-future spooling capacity estimate, which further aids in directing the spooling operation.

Figure 14:
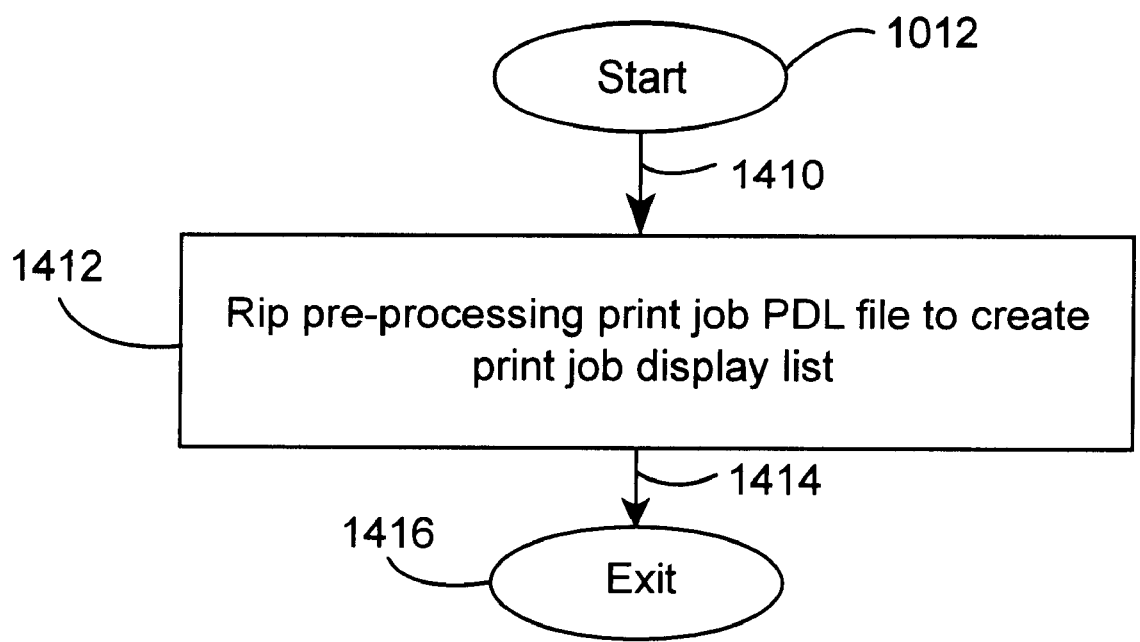
FIG. 14 depicts a detail flowchart of operation 1012 of FIG. 2 performing rip pre-processing the print job PDL file to create a print job display list in accordance with certain embodiments.

FIG. 14 depicts a detail flowchart of operation 1012 of FIG. 2 performing rip pre-processing the print job PDL file to create a print job display list in accordance with certain embodiments.

Arrow 1410 directs the flow of execution from starting operation 1012 to operation 1412. Operation 1412 performs rip pre-processing the print job PDL file to create a print job display list. Arrow 1414 directs execution from operation 1412 to operation 1416. Operation 1416 terminates the operations of this flowchart.

The preceding embodiments have been provided by way of example and are not meant to constrain the scope of the following claims.

What is claimed is:

1. A method performing print job processing initiated by a client communicating-computer communicating with a printer server system of at least one printer server computer communicating with at least one printer comprising:
   said client communicating-computer performing the collection comprising
      executing a client application to create a print job request;
      using a PDL driver based upon said print job request to create a print job PDL file;
      rip pre-processing said print job PDL file to create a smart print job ticket;
      sending said smart print job ticket to said printer server system; and
      sending said print job PDL file to said printer server system; and said printer server system performing the collection comprising:
         receiving said smart print job ticket to create a received smart print job ticket;
         receiving said print job PDL to create a received print job PDL file;
         spooling said received print job PDL file based upon said received smart print job ticket to create a spooled PDL file;
         ripping said spooled PDL file based upon said received smart job ticket to create a ripped print job; and
         sending said print job based upon said received smart job ticket to a printer.

2. The method of claim 1, further comprising the step of: compressing said ripped print job to create a compressed print job.

3. The method of claim 1,
   wherein said smart print job ticket includes at least one of the collection comprising a page count; a PDL file size; an image call complexity measure; a page complexity measure; and resource requirements.

4. The method of claim 3,
   wherein said smart print job ticket includes a page count; a PDL file size; an image call complexity measure; and a page complexity measure.

5. The method of claim 3,
   wherein said page complexity measure comprises a page size histogram.

6. The method of claim 5,
   wherein said page size histogram further comprises a mean page size.

7. The method of claim 5,
   wherein said image call complexity measure comprises at least one of the collection comprising an image call count total; and an image call count per page histogram.

8. The method of claim 7,
   wherein said image call count per page histogram comprises a mean image call count per page.

9. The method of claim 1,
   wherein a client computer collection of at least two client communicating-computers, each client communicating-computer communicating with said printer server system;
   wherein performing print job processing initiated by each of said client communicating-computer of said client computer collection communicating with said printer server system comprises
      executing said client application to create said print job request;
      using said PDL driver based upon said print job request to create said print job PDL file;
      rip pre-processing said print job PDL file to create said smart print job ticket;
      sending said smart print job ticket with said page count to said printer server system; and
      sending said print job PDL file to said printer server system.

10. The method of claim 9,
    wherein sending said print job PDL file to said printer server system further comprises
       receiving a print job directive from said printer server system based upon said received print job ticket to create a received print job directive; and
       sending said print job PDL file to said printer server system based upon said received print job directive; and
    wherein receiving said print job ticket to create a received print job ticket further comprises
       processing said received print job ticket to create said print job directive; and
       sending said print job directive to said client communicating-computer.

11. The method of claim 10,
    wherein said printer server system further comprises a printer gateway collection of at least two printer server computers, each communicating to at least one of said client communicating-computers of said client computer collection;
    wherein processing said received print job ticket to create said print job directive comprises
       inserting a printer server computer destination belonging to said printer gateway collection into said print job directive;
    wherein sending said print job PDL file to said printer server system further comprises
       determining said printer server computer destination from said client communication directive of said print job directive; and sending said print job PDL file to said printer server computer destination.

12. The method of claim 10, wherein said printer server system further comprises a print job processor collection comprising at least two print job processors each with a print job capacity collection comprising a spooling capacity; and wherein processing said received print job ticket to create said print job directive comprises examining said received print job ticket and said spooling capacity of said print job processors of said print job processor collection to create a print job spooling directive; and inserting said print job spooling directive into said print job directive.

13. The method of claim 12, wherein said print job capacity collection of each of said print job processors of said print job processor collection further comprising a printer connectivity capacity;

wherein processing said received print job ticket to create said print job directive comprises examining said received print job ticket and said printer connectivity capacity of said print job processors of said print job processor collection to create a print job printer directive; and inserting said print job printer directive into said print job directive.

14. The method of claim 13, wherein examining said received print job ticket and said spooling capacity of said print job processors of said print job processor collection to create said print job spooling directive further comprises examining said received print job ticket and said spooling capacity and said printer connectivity capacity of said print job processors of said print job processor collection to create said print job spooling directive; and wherein examining said received print job ticket and said printer connectivity capacity of said print job processors of said print job processor collection to create said print job printer directive comprises examining said received print job ticket and said printer connectivity capacity of said print job processors of said print job processor collection and said print job spooling directive to create said print job printer directive.

15. The method of claim 13, wherein said print job capacity collection of each of said print job processors of said print job processor collection further comprising a ripping capacity;

wherein processing said received print job ticket to create said print job directive comprises examining said received print job ticket and said ripping capacity of said print job processors of said print job processor collection to create a print job ripping directive; and inserting said print job ripping directive into said print job directive.

16. The method of claim 15, wherein examining said received print job ticket and said spooling capacity of said print job processors of said print job processor collection to create a print job spooling directive further comprises examining said received print job ticket and said spooling capacity and said printer connectivity capacity and said ripping capacity of said print job processors of said print job processor collection to create a print job spooling directive;

wherein examining said received print job ticket and said ripping capacity of said print job processors of said print job processor collection to create a print job ripping directive comprises examining said received print job ticket and said ripping capacity of said print job processors of said print job processor collection and said spooling directive to create a print job ripping directive; and wherein examining said received print job ticket and said printer connectivity capacity of said print job processors of said print job processor collection to create a print job printer directive comprises examining said received print job ticket and said printer connectivity capacity of said print job processors of said print job processor collection and said print job spooling directive and said print job ripping directive to create a print job printer directive.

17. The method of claim 16, wherein said print job capacity collection of each of said print job processors of said print job processor collection further comprising a print job compression capacity;

wherein processing said received print job ticket to create said print job directive comprises examining said received print job ticket and said ripping capacity and said print job compression capacity of said print job processors of said print job processor collection to create a print job compression directive; and inserting said print job compression directive into said print job directive.

18. The method of claim 17, wherein examining said received print job ticket and said spooling capacity and said printer connectivity capacity and said ripping capacity of said print job processors of said print job processor collection to create a print job spooling directive further comprises examining said received print job ticket and said spooling capacity and said printer connectivity capacity and said ripping capacity and said print job compression capacity of said print job processors of said print job processor collection to create a print job spooling directive;

wherein examining said received print job ticket and said ripping capacity of said print job processors of said print job processor collection and said spooling directive to create a print job ripping directive comprises examining said received print job ticket and said ripping capacity and said print job compression capacity of said print job processors of said print job processor collection and said spooling directive to create a print job ripping directive; and wherein examining said received print job ticket and said printer connectivity capacity of said print job processors of said print job processor collection and said print job spooling directive and said print job ripping directive to create a print job printer directive comprises examining said received print job ticket and said printer connectivity capacity of said print job processors of said print job processor collection and said print job spooling directive and said print job ripping directive and said print job compression directive to create a print job printer directive.

19. The method of claim 12,
wherein said spooling capacity comprises a spooling memory capacity comprising a maximum spooling memory capacity and an available spooling memory capacity.

20. The method of claim 19,
wherein said spooling memory capacity further comprises a committed spooling memory capacity.

21. The method of claim 1,
wherein rip pre-processing said print job PDL file to create a smart print job ticket comprises rip pre-processing said print job PDL file to create a print job display list.

22. A program operating system executing as program code segments residing in computer readable memory accessibly coupled to a client communicating-computer contained in a client computer collection and as program code segments residing in computer readable memory accessibly coupled to at least one printer server computer belonging to a printer server system supporting performing print job processing initiated by a client communicating-computer communicating said printer server computer comprising:
said client communicating-computer performing the collection of program code segments comprising
a program code segment supporting executing a client application to create a print job request;
a program code segment supporting using a PDL driver based upon said print job request to create a print job PDL file;
a program code segment supporting rip pre-processing said print job PDL file to create a smart print job ticket;
a program code segment supporting sending said smart print job ticket to said printer server system; and
a program code segment supporting sending said print job PDL file to said printer server system; and
said printer server system performing the collection of program code segments comprising
a program code segment supporting receiving said smart print job ticket to create a received smart print job ticket;
a program code segment supporting receiving said print job PDL to create a received print job PDL file;
a program code segment supporting spooling said received print job PDL file based upon said received smart print job ticket to create a spooled PDL file;
a program code segment supporting ripping said spooled PDL file based upon said received smart job ticket to create a ripped print job; and
a program code segment supporting sending said print job based upon said received smart job ticket to a printer.

23. The method of claim 22, further comprising:
a program code segment supporting compressing said ripped print job to create a compressed print job.

24. The method of claim 22,
wherein said smart print job ticket includes at least one of the collection comprising a page count; a PDL file size; an image call complexity measure; and a page complexity measure.

25. The method of claim 23,
wherein said smart print job ticket includes a page count; a PDL file size; an image call complexity measure; and a page complexity measure.

26. The method of claim 25,
wherein said page complexity measure comprises a page size histogram.

27. The method of claim 26,
wherein said page size histogram further comprises a mean page size.

28. The method of claim 26,
wherein said image call complexity measure comprises at least one of the collection comprising an image call count total; and an image call count per page histogram.

29. The method of claim 28,
wherein said image call count per page histogram comprises a mean image call count per page.

30. The method of claim 22,
wherein said client computer collection contains at least two of said client communicating-computers, each of said client communicating-computer communicating with said printer server system and each of said client communicating-computer accessibly coupled to said computer memory;
wherein said program operating system performing print job processing initiated by each of said client communicating-computer of said client computer collection communicating with said printer server system comprises
said coupled computer readable memory of each of said communicating client communicating-computers comprises
said program code segment supporting executing a client application to create a print job request;
said program code segment supporting using a PDL driver based upon said print job request to create a print job PDL file;
said program code segment supporting rip preprocessing said print job PDL file to create a smart print job ticket;
said program code segment supporting sending said smart print job ticket with said page count to said printer server system; and
said program code segment supporting sending said print job PDL file to said printer server system.

31. The method of claim 30,
wherein said program code segment supporting sending said print job PDL file to said printer server system further comprises
a program code segment supporting receiving a print job directive from said printer server system based upon said received print job ticket;
wherein said program code segment supporting receiving said print job ticket with said page count to create a received print job ticket further comprises
a program code segment supporting processing said received print job ticket to create said print job directive; and
a program code segment supporting sending said print job directive to said client communicating-computer.

32. The method of claim 31,
wherein said printer server system further comprises a printer gateway collection of at least two printer server computers, each communicating to at least one of said client communicating-computers of said client computer collection;
wherein said program code segment supporting processing said received print job ticket to create said print job directive comprises
a program code segment supporting inserting a printer server computer destination belonging to said printer gateway collection into said print job directive;
wherein said program code segment supporting sending said print job PDL file to said printer server system further comprises a program code segment supporting determining said printer server computer destination from said client communication directive of said print job directive; and a program code segment supporting sending said print job PDL file to said printer server computer destination.

33. The method of claim 31, wherein said printer server system further comprises a printer gateway collection of at least two printer server computers, each communicating to at least one of said client communicating-computers of said client computer collection;

wherein said program code segment supporting processing said received print job ticket to create said print job directive comprises a program code segment supporting inserting a printer server computer destination belonging to said printer gateway collection into said print job directive;

wherein said program code segment supporting sending said print job PDL file to said printer server system further comprises a program code segment supporting determining said printer server computer destination from said client communication directive of said print job directive; and a program code segment supporting sending said print job PDL file to said printer server computer destination.

34. The method of claim 31, wherein said printer server system further comprises a print job processor collection comprising at least two print job processors each with a print job capacity collection comprising a spooling capacity;

wherein said program code segment supporting processing said received print job ticket to create said print job directive comprises a program code segment supporting examining said received print job ticket and said spooling capacity of said print job processors of said print job processor collection to create a print job spooling directive; and a program code segment supporting inserting said print job spooling directive into said print job directive.

35. The method of claim 34, wherein said print job capacity collection of each of said print job processors of said print job processor collection further comprising a printer connectivity capacity;

wherein said program code segment supporting processing said received print job ticket to create said print job directive comprises a program code segment supporting examining said received print job ticket and said printer connectivity capacity of said print job processors of said print job processor collection to create a print job printer directive; and a program code segment supporting inserting said print job printer directive into said print job directive.

36. The method of claim 35, wherein said program code segment supporting examining said received print job ticket and said spooling capacity of said print job processors of said print job processor collection to create said print job spooling directive further comprises a program code segment supporting examining said received print job ticket and said spooling capacity and said printer connectivity capacity of said print job processors of said print job processor collection to create said print job spooling directive; and wherein said program code segment supporting examining said received print job ticket and said printer connectivity capacity of said print job processors of said print job processor collection to create said print job printer directive comprises a program code segment supporting examining said received print job ticket and said printer connectivity capacity of said print job processors of said print job processor collection and said print job spooling directive to create said print job printer directive.

37. The method of claim 35, wherein said print job capacity collection of each of said print job processors of said print job processor collection further comprising a ripping capacity;

wherein said program code segment supporting processing said received print job ticket to create said print job directive comprises a program code segment supporting examining said received print job ticket and said ripping capacity of said print job processors of said print job processor collection to create a print job ripping directive; and a program code segment supporting inserting said print job ripping directive into said print job directive.

38. The method of claim 35, wherein said program code segment supporting examining said received print job ticket and said spooling capacity of said print job processors of said print job processor collection to create a print job spooling directive further comprises a program code segment supporting examining said received print job ticket and said spooling capacity and said printer connectivity capacity and said ripping capacity of said print job processors of said print job processor collection to create a print job spooling directive;

wherein said program code segment supporting examining said received print job ticket and said ripping capacity of said print job processors of said print job processor collection to create a print job ripping directive comprises a program code segment supporting examining said received print job ticket and said ripping capacity of said print job processors of said print job processor collection and said spooling directive to create a print job ripping directive; and wherein said program code segment supporting examining said received print job ticket and said printer connectivity capacity of said print job processors of said print job processor collection to create a print job printer directive comprises a program code segment supporting examining said received print job ticket and said printer connectivity capacity of said print job processors of said print job processor collection and said print job spooling directive and said print job ripping directive to create a print job printer directive.

39. The method of claim 38, wherein said print job capacity collection of each of said print job processors of said print job processor collection further comprising a print job compression capacity;

wherein said program code segment supporting processing said received print job ticket to create said print job directive comprises a program code segment supporting examining said received print job ticket and said ripping capacity and said print job compression capacity of said print job processors of said print job processor collection to create a print job compression directive; and a program code segment supporting inserting said print job compression directive into said print job directive.

40. The method of claim 39, wherein said program code segment supporting examining said received print job ticket and said spooling capacity and said printer connectivity capacity and said ripping capacity of said print job processors of said print job processor collection to create a print job spooling directive further comprises a program code segment supporting examining said received print job ticket and said spooling capacity and said printer connectivity capacity and said ripping capacity and said print job compression capacity of said print job processors of said print job processor collection to create a print job spooling directive;

wherein said program code segment supporting examining said received print job ticket and said ripping capacity of said print job processors of said print job processor collection and said spooling directive to create a print job ripping directive comprises a program code segment supporting examining said received print job ticket and said ripping capacity and said print job compression capacity of said print job processors of said print job processor collection and said spooling directive to create a print job ripping directive; and wherein said program code segment supporting examining said received print job ticket and said printer connectivity capacity of said print job processors of said print job processor collection and said print job spooling directive and said print job ripping directive to create a print job printer directive comprises a program code segment supporting examining said received print job ticket and said printer connectivity capacity of said print job processors of said print job processor collection and said print job spooling directive and said print job ripping directive and said print job compression directive to create a print job printer directive.

41. The method of claim 34, wherein said s pooling capacity comprises a spooling memory capacity comprising a maximum spooling memory capacity and an available spooling memory capacity.

42. The method of claim 41, wherein said spooling memory capacity further comprises a committed spooling memory capacity.

43. The method of claim 22, wherein said program code segment supporting rip pre-processing said print job PDL file to create a smart print job ticket comprises a program code segment supporting rip pre-processing said print job PDL file to create a print job display list.

44. A computing system supporting performing print job processing initiated by a client communicating-computer, comprising:

a client computer collection containing said client communicating-computer accessibly coupled to a computer readable memory, communicating with a printer server computer accessibly coupled to computer readable memory of a printer server system;

wherein a program operating system executing as program code segments residing in said computer readable memory accessibly coupled to said communicating client communicating-computer and as program code segments residing in said computer readable memory accessibly coupled to said printer server computer belonging to said printer server system comprising:

said communicating client communicating-computer performing the collection of program code segments comprising:

a program code segment supporting executing a client application to create a print job request;

a program code segment supporting using a PDL driver based upon said print job request to create a print job PDL file;

a program code segment supporting rip pre-processing said print job PDL file to create a smart print job ticket;

a program code segment supporting sending said smart print job ticket to said printer server system; and a program code segment supporting sending said print job PDL file to said printer server system; and said printer server system performing the collection of program code segments comprising:

a program code segment supporting receiving said smart print job ticket to create a received smart print job ticket;

a program code segment supporting receiving said print job PDL to create a received print job PDL file;

a program code segment supporting spooling said received print job PDL file based upon said received smart print job ticket to create a spooled PDL file;

a program code segment supporting ripping said spooled PDL file based upon said received smart job ticket to create a ripped print job;

a program code segment supporting compressing said ripped print job to create a compressed print job; and a program code segment supporting sending said compressed print job based upon said received smart job ticket to a printer.

45. A computing system of claim 44, wherein said smart print job ticket includes at least one of the collection comprising a page count; a PDL file size; an image call complexity measure; and a page complexity measure.

46. A computing system of claim 45, wherein said smart print job ticket includes a page count; a PDL file size; an image call complexity measure; and a page complexity measure.

47. A computing system of claim 45, wherein said page complexity measure comprises a page size histogram.

48. A computing system of claim 47, wherein said page size histogram further comprises a mean page size.

49. A computing system of claim 45, wherein said image call complexity measure comprises at least one of the collection comprising an image call count total; and an image call count per page histogram.

50. A computing system of claim 49,
wherein said image call per page histogram further comprises a mean image call count per page.
51. A computing system of claim 44,
wherein said client computer collection contains at least two client communicating-computers, each of said client communicating-computers communicating with said printer server system, each of said client communicating-computers accessibly coupled to said computer readable memory;
said program operating system supporting performing print job processing initiated by each of said client communicating-computers of said client computer collection communicating with said printer server system comprises said coupled computer readable memory of each of said client communicating-computers comprising
   said program code segment supporting executing a client application to create a print job request;
   said program code segment supporting using a PDL driver based upon said print job request to create a print job PDL file;
   said program code segment supporting rip pre-processing said print job PDL file to create a smart print job ticket;
   said program code segment supporting sending said smart print job ticket with said page count to said printer server system; and
   said program code segment supporting sending said print job PDL file to said printer server system.
52. A computing system of claim 51,
wherein said program code segment supporting sending said print job PDL file to said printer server system further comprises a program code segment supporting receiving a print job directive from said printer server system based upon said received print job ticket; and
wherein said program code segment supporting receiving said print job ticket with said page count to create a received print job ticket further comprises
   a program code segment supporting processing said received print job ticket to create said print job directive; and
   a program code segment supporting sending said print job directive to said client computer.
53. A computing system of claim 52,
wherein said printer server system further comprises a printer gateway collection of at least two printer server computers, each communicating to at least one of said client computers of said client computer collection;
wherein said program code segment supporting processing said received print job ticket to create said print job directive comprises a program code segment supporting inserting a printer server computer destination belonging to said printer gateway collection into said print job directive;
wherein said program code segment supporting sending said print job PDL file to said printer server system further comprises
   a program code segment supporting determining said printer server computer destination from said client communication directive of said print job directive; and
   a program code segment supporting sending said print job PDL file to said printer server computer destination.

54. A computing system of claim 52,
wherein said printer server system further comprises a print job processor collection comprising at least two print job processors each with a print job capacity collection comprising a spooling capacity;
wherein said program code segment supporting processing said received print job ticket to create said print job directive comprises
   a program code segment supporting examining said received print job ticket and said spooling capacity of said print job processors of said print job processor collection to create a print job spooling directive; and
   a program code segment supporting inserting said print job spooling directive into said print job directive.
55. A computing system of claim 54,
wherein said print job capacity collection of each of said print job processors of said print job processor collection further comprising a printer connectivity capacity;
wherein said program code segment supporting processing said received print job ticket to create said print job directive comprises
   a program code segment supporting examining said received print job ticket and said printer connectivity capacity of said print job processors of said print job processor collection to create a print job printer directive; and
   a program code segment supporting inserting said print job printer directive into said print job directive.
56. A computing system of claim 55,
wherein said program code segment supporting examining said received print job ticket and said spooling capacity of said print job processors of said print job processor collection to create said print job spooling directive further comprises
   a program code segment supporting examining said received print job ticket and said spooling capacity and said printer connectivity capacity of said print job processors of said print job processor collection to create said print job spooling directive; and
wherein said program code segment supporting examining said received print job ticket and said printer connectivity capacity of said print job processors of said print job processor collection to create said print job printer directive comprises
   a program code segment supporting examining said received print job ticket and said printer connectivity capacity of said print job processors of said print job processor collection and said print job spooling directive to create said print job printer directive.
57. A computing system of claim 55,
wherein said print job capacity collection of each of said print job processors of said print job processor collection further comprising a ripping capacity;
wherein said program code segment supporting processing said received print job ticket to create said print job directive comprises
   a program code segment supporting examining said received print job ticket and said ripping capacity of said print job processors of said print job processor collection to create a print job ripping directive; and
   a program code segment supporting inserting said print job ripping directive into said print job directive.
58. A computing system of claim 57,
wherein said program code segment supporting examining said received print job ticket and said spooling capacity of said print job processors of said print job processor collection to create a print job spooling directive further comprises
    a program code segment supporting examining said received print job ticket and said spooling capacity and said printer connectivity capacity and said ripping capacity of said print job processors of said print job processor collection to create a print job spooling directive;

wherein said program code segment supporting examining said received print job ticket and said ripping capacity of said print job processors of said print job processor collection to create a print job ripping directive comprises
    a program code segment supporting examining said received print job ticket and said ripping capacity of said print job processors of said print job processor collection and said spooling directive to create a print job ripping directive; and wherein said program code segment supporting examining said received print job ticket and said printer connectivity capacity of said print job processors of said print job processor collection to create a print job printer directive comprises
    a program code segment supporting examining said received print job ticket and said printer connectivity capacity of said print job processors of said print job processor collection and said print job spooling directive and said print job ripping directive to create a print job printer directive.

59. A computing system of claim 58, wherein said print job capacity collection of each of said print job processors of said print job processor collection further comprising a print job compression capacity;

wherein said program code segment supporting processing said received print job ticket to create said print job directive comprises
    a program code segment supporting examining said received print job ticket and said ripping capacity and said print job compression capacity of said print job processors of said print job processor collection to create a print job compression directive; and
    a program code segment supporting inserting said print job compression directive into said print job directive.

60. A computing system of claim 59, wherein said program code segment supporting examining said received print job ticket and said spooling capacity and said printer connectivity capacity and said ripping capacity of said print job processors of said print job processor collection to create a print job spooling directive further comprises
    a program code segment supporting examining said received print job ticket and said spooling capacity and said printer connectivity capacity and said ripping capacity and said print job compression capacity of said print job processors of said print job processor collection to create a print job spooling directive;

wherein said program code segment supporting examining said received print job ticket and said ripping capacity of said print job processors of said print job processor collection and said spooling directive to create a print job ripping directive comprises
    a program code segment supporting examining said received print job ticket and said ripping capacity and said print job compression capacity of said print job processors of said print job processor collection and said spooling directive to create a print job ripping directive; and wherein said program code segment supporting examining said received print job ticket and said printer connectivity capacity of said print job processors of said print job processor collection and said print job spooling directive and said print job ripping directive to create a print job printer directive comprises
    a program code segment supporting examining said received print job ticket and said printer connectivity capacity of said print job processors of said print job processor collection and said print job spooling directive and said print job ripping directive and said print job compression directive to create a print job printer directive.

61. A computing system of claim 55, wherein said print job processor collection comprises at least one printer server computer.

62. A computing system of claim 61, wherein said print job processor collection further comprises at least one special purpose computer controlled by at least one printer server computer; and wherein said printer connectivity capability of said special purpose computer controlled by said printer server computer is based upon said printer server computer, for each of said special purpose computers of said print job processor collection.

63. A computing system of claim 54, wherein said spooling capacity comprises a spooling memory capacity further comprising a maximum spooling memory capacity; and an available spooling memory capacity.

64. A computing system of claim 63, wherein said spooling memory capacity further comprises a committed spooling memory capacity.

65. A computing system of claim 44, wherein said program code segment supporting rip pre-processing said print job PDL file to create a smart print job ticket comprises
    a program code segment supporting rip pre-processing said print job PDL file to create a print job display list.

66. A method performing print job processing initiated by a client communicating-computer communicating with a printer server system of at least one printer server computer communicating with at least one printer comprising:

said client communicating-computer performing the collection comprising
        executing a client application to create a print job request;
        using a PDL driver based upon said print job request to create a print job PDL file;
        rip pre-processing said print job PDL file to create a smart print job ticket;
        sending said smart print job ticket to said printer server system; and
        sending said print job PDL file to said printer server system.

67. The method of claim 66.

wherein a client computer collection of at least two client communicating-computers, each client communicating-computer communicating with said printer server system;

wherein performing print job processing initiated by each of said client communicating-computer of said client computer collection communicating with said printer server system comprises executing said client application to create said print job request;

using said PDL driver based upon said print job request to create said print job PDL file;

rip pre-processing said print job PDL file to create said smart print job ticket;

sending said smart print job ticket with said page count to said printer server system; and sending said print job PDL file to said printer server system.

68. A program operating system executing as program code segments residing in computer readable memory accessibly coupled to a client communicating-computer contained in a client computer collection supporting performing print job processing initiated by a client communicating-computer communicating with a printer server computer comprising:

said client communicating-computer performing the collection of program code segments comprising a program code segment supporting executing a client application to create a print job request;

a program code segment supporting using a PDL driver based upon said print job request to create a print job PDL file;

a program code segment supporting rip pre-processing said print job PDL file to create a smart print job ticket;

a program code segment supporting sending said smart print job ticket to said printer server system; and a program code segment supporting sending said print job PDL file to said printer server system.

69. The method of claim 68, wherein said client computer collection contains at least two of said client communicating-computers, each of said client communicating-computer communicating with said printer server system and each of said client communicating-computer accessibly coupled to said computer memory;

wherein said program operating system performing print job processing initiated by each of said client communicating-computer of said client computer collection communicating with said printer server system comprises said coupled computer readable memory of each of said communicating client communicating-computers comprises said program code segment supporting executing a client application to create a print job request;

said program code segment supporting using a PDL driver based upon said print job request to create a print job PDL file;

said program code segment supporting rip pre-processing said print job PDL file to create a smart print job ticket;

said program code segment supporting sending said smart print job ticket with said page count to said printer server system; and said program code segment supporting sending said print job PDL file to said printer server system.

70. A computing system supporting performing print job processing initiated by a client communicating-computer, comprising:

a client computer collection containing said client communicating-computer accessibly coupled to a computer readable memory, communicating with a printer server computer accessibly coupled to computer readable memory of a printer server system;

wherein a program operating system executing as program code segments residing in said computer readable memory accessibly coupled to said communicating client communicating-computer comprising:

said communicating client communicating-computer performing the collection of program code segments comprising:

a program code segment supporting executing a client application to create a print job request;

a program code segment supporting using a PDL driver based upon said print job request to create a print job PDL file;

a program code segment supporting rip pre-processing said print job PDL file to create a smart print job ticket;

a program code segment supporting sending said smart print job ticket to said printer server system; and a program code segment supporting sending said print job PDL file to said printer server system.

71. A computing system of claim 70, wherein said client computer collection contains at least two client communicating-computers, each of said client communicating-computers communicating with said printer server system, each of said client communicating-computers accessibly coupled to said computer readable memory;

said program operating system supporting performing print job processing initiated by each of said client communicating-computers of said client computer collection communicating with said printer server system comprises said coupled computer readable memory of each of said client communicating-computers comprising said program code segment supporting executing a client application to create a print job request;

said program code segment supporting using a PDL driver based upon said print job request to create a print job PDL file;

said program code segment supporting rip pre-processing said print job PDL file to create a smart print job ticket;

said program code segment supporting sending said smart print job ticket with said page count to said printer server system; and said program code segment supporting sending said print job PDL file to said printer server system.

* * * * *